(12) United States Patent
Brown

(10) Patent No.: US 6,665,376 B1
(45) Date of Patent: Dec. 16, 2003

(54) SELECTIVELY ACTIVATED INTEGRATED REAL-TIME RECORDING OF TELEPHONE CONVERSATIONS WITH AUTOMATED DOCUMENTATION OF CONSENT TO CALL RECORDING

(75) Inventor: Barry D. Brown, Mesquite, TX (US)

(73) Assignee: T-Netix, Inc., Carrollton, TX (US)

( * ) Notice: Subject to any disclaimer, the term of this patent is extended or adjusted under 35 U.S.C. 154(b) by 0 days.

(21) Appl. No.: 09/178,367

(22) Filed: Oct. 23, 1998

(51) Int. Cl.[7] ............................................... H04M 1/64

(52) U.S. Cl. ................... 379/85; 379/93.01; 379/32.01; 379/8; 379/7; 379/68

(58) Field of Search .................... 379/112, 7, 88.01, 379/223, 67.1, 372, 88.22, 8, 32.01, 93.01; 455/556

(56) References Cited

U.S. PATENT DOCUMENTS

| | | | |
|---|---|---|---|
| 3,851,121 A | 11/1974 | Marvin | |
| 4,001,513 A | 1/1977 | Naylor | |
| 4,002,848 A | 1/1977 | Stein | |
| 4,188,508 A | 2/1980 | Rogers et al. | |
| 4,310,726 A | 1/1982 | Asmuth | |
| 4,518,825 A | 5/1985 | Brinkerhoff et al. | 179/11 |
| 4,559,416 A | 12/1985 | Theis et al. | 179/7.1 R |
| 4,602,129 A | 7/1986 | Matthews et al. | |
| 4,696,031 A | 9/1987 | Freudberg et al. | 379/386 |
| 4,726,057 A | 2/1988 | Doerry et al. | 379/145 |
| 4,799,255 A | 1/1989 | Billinger et al. | 379/189 |
| 4,815,120 A | 3/1989 | Kosich | 379/34 |

(List continued on next page.)

FOREIGN PATENT DOCUMENTS

JP 5-30193 5/1993

OTHER PUBLICATIONS

HR solutions, http://ww.solutionshrd.com/methods_of_electronic_monitoring.htm, p. 4 of 5, Telephone Surveillance.*

Jones International, http://www.jonesencyclo.com/encyclo/update/ecpa.html, 1–7, Electronic Communications Privacy Act.*

Bahl, L. "A Maximum Likelihood Approach to Continuous Speech Recovery," Readings in Speech Recognition Ed. A. Waibel and K. Lee, Morgan Kaufmann Publishers, pp 308–319, IEEE 1983.

(List continued on next page.)

Primary Examiner—Fan Tsang
Assistant Examiner—Gerald Gauthier
(74) Attorney, Agent, or Firm—Fenwick & West LLP

(57) ABSTRACT

A system for controlling and monitoring the recording of telephone calls in institutions such as jails and correctional facilities, and for obtaining consent to such recording and monitoring. Calls are recorded automatically in response to the occurrence of specific triggering events, as pre-defined under software control by a system administrator. Triggering events may include, for example, use of a specific line, attempts to use particular features (such as three-way calling), attempts to dial particular telephone numbers, or use by a particular person. Consent to recording or monitoring is obtained from either the calling or called party, or both, in a language selected for such party. Evidence of which prompts were played to request consent, the language of such prompts, and whether consent was given is stored in a computer readable record. Recorded calls are digitized and stored in standard MS-DOS files on either a local computer system or a remote computer across a network. Stored digitized recordings may be selected for playback under software control by a system administrator. The system of the present invention allows control of recordings from within a conventional telephone system. The integrated nature of the system provides cost savings and improved flexibility.

30 Claims, 29 Drawing Sheets

U.S. PATENT DOCUMENTS

| | | | |
|---|---|---|---|
| 4,885,765 A | | 12/1989 | Shirakawa |
| 4,896,348 A | | 1/1990 | Grantland et al. ............ 379/145 |
| 4,899,375 A | | 2/1990 | Bauer et al. |
| 4,901,341 A | | 2/1990 | Carter et al. .................. 379/67 |
| 4,922,519 A | | 5/1990 | Daudelin |
| 4,922,520 A | | 5/1990 | Bernard et al. ................ 379/88 |
| 4,924,488 A | | 5/1990 | Kosich .......................... 379/34 |
| 4,933,966 A | | 6/1990 | Hird et al. |
| 4,933,967 A | | 6/1990 | Lo et al. ....................... 379/207 |
| 4,935,956 A | * | 6/1990 | Hellwarth et al. ............ 379/112 |
| 4,937,862 A | | 6/1990 | Kosich |
| 4,993,068 A | | 2/1991 | Piosenka et al. ............... 380/23 |
| 5,020,095 A | * | 5/1991 | Morganstein et al. ......... 379/67 |
| 5,023,869 A | | 6/1991 | Grover et al. ................. 370/84 |
| 5,023,906 A | | 6/1991 | Novas |
| 5,033,088 A | | 7/1991 | Shipman ....................... 381/43 |
| 5,054,059 A | | 10/1991 | Stern et al. |
| 5,063,593 A | | 11/1991 | Kwon ........................... 379/386 |
| 5,109,405 A | | 4/1992 | Morganstein |
| 5,131,024 A | | 7/1992 | Pugh et al. |
| 5,150,357 A | | 9/1992 | Hopner et al. ............... 370/68.1 |
| 5,163,083 A | | 11/1992 | Dowden et al. |
| 5,187,740 A | | 2/1993 | Swaim et al. |
| 5,200,995 A | | 4/1993 | Gaukel et al. ............... 379/200 |
| 5,210,789 A | * | 5/1993 | Jeffus et al. ................. 379/223 |
| 5,222,120 A | | 6/1993 | McLeod et al. |
| 5,229,764 A | | 7/1993 | Matchett et al. |
| 5,276,731 A | | 1/1994 | Arbel et al. ................. 379/142 |
| 5,305,312 A | | 4/1994 | Fornek et al. |
| 5,309,505 A | | 5/1994 | Szlam et al. .................. 379/88 |
| 5,311,589 A | | 5/1994 | Bennett et al. ............. 379/386 |
| 5,319,702 A | | 6/1994 | Kitchin et al. ............... 379/189 |
| 5,325,427 A | | 6/1994 | Dighe .......................... 379/386 |
| 5,327,489 A | | 7/1994 | Anderson et al. |
| 5,329,578 A | | 7/1994 | Brennan et al. ............... 379/67 |
| 5,335,266 A | | 8/1994 | Richardson, Jr. et al. ..... 379/88 |
| 5,345,595 A | | 9/1994 | Johnson et al. ............ 455/33.1 |
| 5,351,287 A | | 9/1994 | Bhattacharyya et al. ...... 379/95 |
| 5,355,403 A | | 10/1994 | Richardson, Jr. et al. ..... 379/88 |
| 5,369,699 A | * | 11/1994 | Page et al. .................... 379/88 |
| 5,375,161 A | | 12/1994 | Fuller et al. |
| 5,442,696 A | | 8/1995 | Lindberg et al. ............ 379/386 |
| 5,452,347 A | | 9/1995 | Iglehart et al. |
| 5,465,293 A | | 11/1995 | Chiller et al. |
| 5,471,519 A | | 11/1995 | Howe et al. |
| 5,483,582 A | | 1/1996 | Pugh et al. |
| 5,483,593 A | | 1/1996 | Gupta et al. ................. 379/386 |
| 5,485,507 A | * | 1/1996 | Brown et al. .................. 379/88 |
| 5,535,261 A | * | 7/1996 | Brown et al. .................. 379/67 |
| 5,539,812 A | | 7/1996 | Kitchin et al. |
| 5,544,231 A | * | 8/1996 | Cho ............................. 379/156 |
| 5,606,604 A | | 2/1997 | Rosenblatt et al. |
| 5,617,471 A | | 4/1997 | Rogers et al. |
| 5,627,887 A | | 5/1997 | Freedman |
| 5,651,056 A | | 7/1997 | Eting et al. ................... 379/88 |
| 5,655,013 A | | 8/1997 | Gainsboro .................. 379/188 |
| 5,722,418 A | | 3/1998 | Bro |
| 5,724,404 A | | 3/1998 | Garcia et al. |
| 5,745,553 A | | 4/1998 | Mirville et al. |
| 5,796,811 A | | 8/1998 | McFarlen ................... 379/189 |
| 5,799,068 A | | 8/1998 | Kikinis et al. |
| 5,805,685 A | | 9/1998 | McFarlen ................... 379/189 |
| 5,809,125 A | | 9/1998 | Gammino .................. 379/189 |
| 5,883,945 A | | 3/1999 | Richardson et al. ........ 379/189 |
| 5,960,064 A | | 9/1999 | Foladare et al. |
| 6,064,963 A | * | 5/2000 | Gainsboro ............... 379/88.01 |
| 6,072,860 A | * | 6/2000 | Kek et al. .................. 379/67.1 |
| 6,134,320 A | * | 10/2000 | Swan et al. ................. 379/372 |
| 6,141,406 A | | 10/2000 | Johnson ..................... 379/189 |
| 6,169,789 B1 | * | 1/2001 | Rao et al. ................. 379/90.01 |
| 6,188,751 B1 | | 2/2001 | Scherer |
| 6,249,570 B1 | * | 6/2001 | Glowny et al. ........... 379/88.22 |
| 6,366,653 B1 | * | 4/2002 | Yeh et al. .................. 379/93.05 |
| 6,529,602 B1 | * | 3/2003 | Walker et al. .............. 379/67.1 |
| 2001/0041590 A1 | * | 11/2001 | Silberfenig et al. ......... 455/556 |

OTHER PUBLICATIONS

Batten, A. "Personal Communications Service and the Intelligent Network," British Telecommunications Engineering, vol 9, pp 88–91 Aug. 1990.

Lee, K. "Large–Vocabulary Speaker–Independent Continuous Speech Recognition Using HMM," Carnegie Mellon University Department of Electrical and Computer Engineering, CMU–CS–88–148 Apr. 1988.

System 20, Nov. 1992, Specially designed for correctional facilities, from County Jails to State and Federal Prisons. VAC.

Telematic "ConQuest III Intimate Telephone System" Nov. 1992.

"LazerPhone User Reference Manual," 150 pages, edition and publisher unknown.

"LazerPhone Inmate Telephone System, Users Manual Version 1.0," pp 1–29, published Oct. 1998 by Schlumberger Technologies, Inc./Global Tel*Link of Mobile, Alabama.

"LazerPhone Inmate Telephone System, Users Manual Version 1.0," pp 1–29, published Mar. 1999 by Schlumberger Technologies, Inc./Global Tel*Link of Mobile, Alabama.

"LazerVoice Digital Recording System Inmates Services, Users Manual Version 2.22," pp 1–41, published Apr. 28, 1998 by Schlumberger Technologies, Inc./LazerVoice of Mobile, Alabama.

Brochures entitled "LazerPhone—Powerful Performance Uncompromising Standards," 4 pages, published 1998 Schlumberger Technologies, Inc. of Mobile, Alabama.

Brochure entitled "LazerVoice—Simply Perfect," 5 pages, published 1998 Schlumberger Technologies, Inc. of Mobile, Alabama.

"Chapter I. System Overview" from LazerPhone Technical Manual, pp. 1.1–1.6, published by Schlumberger Technologies, Inc. of Mobile, Alabama.

"Chapter VI. Facility Install & Network" from LazerPhone Technical Manual, 24 pages, published by Schlumberger Technologies, Inc. of Mobile, Alabama.

Patent Abstracts of Japan; Publication No. 05–030193 dated May 2, 1993; Application No. 03–178582; Inventor Nakano Masakazu; Applicant NEC Corp.

Readings in Speech Recognition, Edited by Alex Waibel and Kai–Fu Lee; A Maximum Likelihood Approach to Continuous Speech Recognition.

British Telecommunications Engineering dated Aug. 1990 (Aug. 27–Sep. 1, 1990); Personal Communications Services and the Intelligent Network.

S3.7 Large–Vocabulary Speaker–Independent Continuous Speech Recognition Using HMM; Kai–Fu Lee and Hsiao–Wuen Hon.

System 20; Specially designed for correctional facilities from County Jails to State and Federal Prisons; VAC.

Tele–Matic Corporation; Conquest III Inmate Telephone System.

* cited by examiner

| LN | STATUS | NUMBER | ZONE | TIME | LN | STATUS | NUMBER | ZONE | TIME |
|---|---|---|---|---|---|---|---|---|---|
| 1 | GET NAME | 2136528002 | CB C | 0:00 | 13 | ASK NAME | 3032458871 | CB L | 0:00 |
| 2 | INSTRUCT | | CB F | 0:00 | 14 | THANKS | | CB M | 0:00 |
| 3 | ASK NAME | 8178843420 | INF 1 | 0:00 | 15 | DIALTONE | 7126509834 | INF 2 | 0:00 |
| 4 | ASK NAME | 2142894329 | CB B | 0:00 | 16 | INVALID | | HLDG 2 | 0:00 |
| 5 | THANKS | | HLDG 1 | 0:00 | 17 | INSTRUCT | | CB J | 0:00 |
| 6 | THANKS | | CB G | 0:00 | 18 | THANKS | | ISO 3 | 0:00 |
| 7 | INSTRUCT | | CB D | 0:00 | 19 | ASK NAME | 7137539724 | ISO 4 | 0:00 |
| 8 | GET NUMBER | | ISO 1 | 0:00 | 20 | ASK NAME | 4172419391 | CB K | 0:00 |
| 9 | INSTRUCT | 4126471570 | ISO 2 | 0:00 | 21 | INVALID | | CB N | 0:00 |
| 10 | GET NAME | | CB I | 0:00 | 22 | ASK NAME | 4103324564 | CB O | 0:00 |
| 11 | INSTRUCT | | CB E | 0:00 | 23 | THANKS | | HALL | 0:00 |
| 12 | GET NAME | 8178843420 | CB H | 0:00 | 24 | ASK NAME | 2177725972 | CB P | 0:00 |

GATEWAY TECHNOLOGIES – COPYRIGHT 1992 – ALL RIGHTS RESERVED

09:13:23a ———— CPS–4000 ———— FRI 09/04/92

*FIG. 3A*

| LINE | CURRENT STATE | CALLS | OKAY | DENY | BAD | | LINE | CURRENT STATE | CALLS | OKAY | DENY | BAD |
|---|---|---|---|---|---|---|---|---|---|---|---|---|
| 1 | INSTRUCT | 1 | 0 | 0 | 0 | | 13 | INSTRUCT | 1 | 0 | 0 | 0 |
| 2 | GET NUMBER | 1 | 0 | 0 | 0 | | 14 | LANGUAGE | 1 | 0 | 0 | 0 |
| 3 | INSTRUCT | 1 | 0 | 0 | 0 | | 15 | LANGUAGE | 1 | 0 | 0 | 0 |
| 4 | LANGUAGE | 1 | 0 | 0 | 0 | | 16 | INSTRUCT | 1 | 0 | 0 | 0 |
| 5 | LANGUAGE | 1 | 0 | 0 | 0 | | 17 | LANGUAGE | 1 | 0 | 0 | 0 |
| 6 | INSTRUCT | 1 | 0 | 0 | 0 | | 18 | EMERG CALL | 1 | 0 | 0 | 0 |
| 7 | INSTRUCT | 1 | 0 | 0 | 0 | | 19 | THANKS | 1 | 0 | 0 | 0 |
| 8 | LANGUAGE | 1 | 0 | 0 | 0 | | 20 | LANGUAGE | 1 | 0 | 0 | 0 |
| 9 | LANGUAGE | 1 | 0 | 0 | 0 | | 21 | LANGUAGE | 1 | 0 | 0 | 0 |
| 10 | INSTRUCT | 1 | 0 | 0 | 0 | | 22 | GET NUMBER | 1 | 0 | 0 | 0 |
| 11 | LANGUAGE | 1 | 0 | 0 | 0 | | 23 | INSTRUCT | 1 | 0 | 0 | 0 |
| 12 | LANGUAGE | 1 | 0 | 0 | 0 | | 24 | INSTRUCT | 1 | 0 | 0 | 0 |

GATEWAY TECHNOLOGIES — COPYRIGHT 1992 — ALL RIGHTS RESERVED

EMERGENCY CALL LOGGED AT FRI SEP 04 09:14:58 1992 — TYPE CODE 2

09:15:00a ———— CPS-4000 ———— FRI 09/04/92

*FIG. 3B*

```
┌─ SYSTEM PARAMETER FILE ─────────────────────────────────────────────┐
│                                                                      │
│  SYSTEM ID : RCK1A            SITE NAME : BARRY'S COUNTY JAIL        │
│  SYSTEM PW :                  LINES : 16                             │
│  CALLBACK # : 0000000         DEBUG DISP : N      DEBUG WRITE : N    │
│                                                                      │
│  TIME SLICE TICKS : 20      PD MAX MAKE : 50      RING RESET : 80    │
│  DTMF INTERDIGIT : 5        PD MIN MAKE : 2       DT LOW FREQ : 300  │
│  DTMF DURATION : 10         PD INTERDIGIT : 15    DT HIGH FREQ : 600 │
│  RING ON DETECT : 3         PD MIN BREAK : 2      DT PERCENTAGE : 20 │
│  RING OFF DETECT : 5                                                 │
│  OFF-HOOK DELAY : 50        LOCAL AREA CODE : 214    BEEP ON DROP : N│
│  SILENCE DEBOUNCE : 4       MAXIMUM NAME RECORD : 3  BEEP DIALING : N│
│  LC OFF TIME : 20           ALLOW PHONE TESTING : Y                  │
└──────────────────────────────────────────────────────────────────────┘

GATEWAY TECHNOLOGIES - COPYRIGHT 1992 - ALL RIGHTS RESERVED

┌─ OUTSIDE LINE NUMBERS ──────────────────────────────────────────────┐
│  1. 2147224900   6. 2147224905   11. 2147224809   16. 2222222222  21.│
│  2. 2147224905   7. 2147224810   12. 2147224809   17.              22.│
│  3. 2147224906   8. 2147224811   13. 2222222222   18.              23.│
│  4. 2147224907   9. 2147224813   14. 2222222222   19.              24.│
│  5. 2147224908  10. 2147224813   15. 2222222222   20.                │
└──────────────────────────────────────────────────────────────────────┘

─── CPS-4000 ───
              ADD COPY EDIT DEL VIEW REPORT TOTAL QUIT
```

FIG. 4A

―― SYSTEM PARAMETER FILE  – PAGE 2 ――

LOCAL DIALING PREFIX : 9
INTRALATA DIALING PREFIX : 9
LONG DISTANCE DIALING PREFIX : 9
SYSTEM START TIME : 07:00
SYSTEM STOP TIME : 24:00
RECYCLE TIME : 00:00
MESSAGE # FOR 1st BRANDING : 0
MESSAGE # FOR 2nd BRANDING : 0
MESSAGE # FOR IDENTIFICATION : 0
MESSAGE # FOR LOCATION : 0
LANGUAGE SUPPORT    FIRST : Y   SECOND : Y   THIRD : N   FOURTH : N
MAXIMUM ATTEMPTS/NUMBER/DAY : 50   MAX OF 480 MINUTES/NUMBER/ 30 DAYS LD
ALLOW PERSON/PERSON COLLECT : N   MAX OF 60 MINUTES/NUMBER/ 1 DAYS LC

―――― GATEWAY TECHNOLOGIES – COPYRIGHT 1991 – ALL RIGHTS RESERVED ――――

LINE LOCATIONS

1. CB 1      5. CB 5      9. HC205     13.     17.     21.
2. CB 2      6. CB 6     10. ISO       14.     18.     22.
3. CB 3      7. CB 7     11.           15.     19.     23.
4. CB 4      8. HC208    12.           16.     20.     24.

――――――――――――――― CAP-SYSTEM ―――――――――――――――
ADD COPY EDIT DEL VIEW REPORT TOTAL QUIT

FIG. 4B

```
----- CHANNEL PARAMETER FILE -----
CHANNEL NUMBER : 1                    DTMF DETECTION TIME     : 5
TIME LIMIT : 600                      DTMF EDGE EVENT         : 2
ID SYSTEM : N  FULL : N               DTMF RECEIVE GUARD TIME : 0
PULSE DETECT : Y
PASSIVE ACCEPT : N                    SILENCE COMPRESSION DELAY : 200
START : 00:00  STOP : 24:00           COMMISSARY ACTIVE : Y

NUMBER OF RINGS BEFORE NO ANSWER     : 4
DELAY BEFORE CALL ANALYSIS BEGINS    : 25
TIME OUT DELAY ON NO SIGNAL          : 4000
DELAY BEFORE LC DROP IS A CONNECT    : -1
DELAY BEFORE RETURNING LC DROP       : 10
RETURN CONNECT ON LEADING EDGE       : 2
TIME OUT FOR CONTINUOUS SIGNAL       : 650
```

GATEWAY TECHNOLOGIES — COPYRIGHT 1991 — ALL RIGHTS RESERVED

----- CAP-SYSTEM -----
ADD COPY EDIT DEL VIEW REPORT TOTAL QUIT

*FIG. 5A*

--- CHANNEL PARAMETER FILE - PAGE 2 ---

TOLERANCE ABOVE 1st LOW : 13
TOLERANCE BELOW 1st LOW : 13
TOLERANCE ABOVE 2nd LOW : 13
TOLERANCE BELOW 2nd LOW : 13
TOLERANCE ABOVE HIGH : 13
TOLERANCE BELOW HIGH : 13

MAX TIME FOR 1st LOW TO DETECT BUSY : 90
MAX TIME FOR 2nd LOW TO DETECT BUSY : 90
MAX TIME FOR HIGH TO DETECT BUSY : 90
NUMBER OF ADDITIONAL STATES BEFORE BUSY : 0
SMALLEST SILENCE INTERVAL : 15
SMALLEST SOUND INTERVAL : 19

GATEWAY TECHNOLOGIES - COPYRIGHT 1991 - ALL RIGHTS RESERVED

CAP-SYSTEM
ADD COPY EDIT DEL VIEW REPORT TOTAL QUIT

*FIG. 5B*

```
---- CHANNEL PARAMETER FILE - PAGE 3 ----

MAX TIME FOR SHORT LOW DETECTED AS DOUBLE RING : 90
MIN TIME FOR LONG LOW DETECTED AS DOUBLE RING : 225

ENABLE OPERATOR INTERCEPT DETECTION : Y
MIN INTERCEPT DURATION FOR DETECTION : 10
SILENCE TRAILING EDGE DEBOUNCE : 0
HIGH SIZE : 90
LOW MAX A : 700
LOW MAX B : 530
BEGIN CALL ANALYSIS ON RING NUMBER : 1
HIGH CEILING : 78
LOW CEILING : 58
```

GATEWAY TECHNOLOGIES — COPYRIGHT 1991 — ALL RIGHTS RESERVED

____ CAP-SYSTEM ____
ADD COPY EDIT DEL VIEW REPORT TOTAL QUIT

FIG. 5C

CHANNEL PARAMETER FILE - PAGE 4

LOW ALLOWED FREQUENCY : 900
HIGH ALLOWED FREQUENCY : 1000
MIN TIME WITHIN FREQUENCY FOR DETECT : 5
BAD SIGNAL REJECT PERCENTAGE : 20
MAX ANSWER DURATION : 1000
SILENCE DEGLITCHING VALUE : 60

GATEWAY TECHNOLOGIES - COPYRIGHT 1991 - ALL RIGHTS RESERVED

CAP-SYSTEM
ADD COPY EDIT DEL VIEW REPORT TOTAL QUIT

*FIG. 5D*

```
┌─────────────────────────────────────┐  ┌──────
│ ─── NUMBER CONTROL FILE ───         │  │
│                                     │  │
│ NUMBER : 2142222222                 │  │
│ DATE LAST VERIFIED/CHANGED : 09/02/92│  │
│ VERIFIED/CHANGED BY : BDB           │  │
│ COUNT SINCE CHANGED/VERIFIED : 0    │  │
│ RESERVED : 0                        │  │
│ ALLOW PASSIVE ACCEPT : N            │  │
│ BLOCK CODE : UOK                    │  │
│ DIALING INSTRUCTIONS :              │  │
│ LOCAL CALL : Y                      │  │
│                                     │  │
│ RECORD CALLS TO THIS NUMBER : N     │  │
│ ALARM CALLS TO THIS NUMBER : N      │  │
└─────────────────────────────────────┘  └──────
```

GATEWAY TECHNOLOGIES – COPYRIGHT 1992 – ALL RIGHTS RESERVED

| RESET DATE : | ATTEMPTS 09/03/92 0 N | ACCEPTS 09/03/92 0 N | TIME 09/03/92 0 SECONDS N |
|---|---|---|---|
| COUNT : |  |  |  |
| OVERRIDE : |  |  |  |

CPS-4000

ADD COPY EDIT DEL VIEW REPORT TOTAL QUIT

FIG. 6

```
┌─────────────────────────────────┐  ┌──────────┐
│ ─── NPA-NXX FILE ───            │  │          │
│                                 │  │          │
│ NPANXX : 214241                 │  │          │
│ DATE LAST VERIFIED/CHANGED : 06/24/92 │  │
│ VERIFIED/CHANGED BY : BDB       │  │          │
│ ALLOW PASSIVE ACCEPT : N        │  │          │
│ BLOCK CODE : UOK                │  │          │
│ DIALING INSTRUCTIONS :          │  │          │
│ LOCAL CALL : Y                  │  │          │
└─────────────────────────────────┘  └──────────┘
```

GATEWAY TECHNOLOGIES — COPYRIGHT 1992 — ALL RIGHTS RESERVED

CPS-4000
ADD COPY EDIT DEL VIEW REPORT TOTAL QUIT

FIG. 7

―― NPA ――

NPA : 000
DATE LAST VERIFIED/CHANGED : 04/30/92
VERIFIED/CHANGED BY : GTW
ALLOW PASSIVE ACCEPT : N
BLOCK CODE : HBL
DIALING INSTRUCTIONS :

GATEWAY TECHNOLOGIES – COPYRIGHT 1991 – ALL RIGHTS RESERVED

―― CAP-SYSTEM ――
ADD COPY EDIT DEL VIEW REPORT TOTAL QUIT

FIG. 8

```
┌─────────────────────────────────────────┐  ┌──────────┐
│ ─── NXX FILE ───                        │  │          │
│                                         │  │          │
│ NXX : 000                               │  │          │
│ DATA LAST VERIFIED/CHANGED : 04/30/92   │  │          │
│ VERIFIED/CHANGED BY : GTW               │  │          │
│                                         │  │          │
│                                         │  │          │
│ PLEASE NOTE THAT ALL NXX's IN THIS FILE │  │          │
│ ARE BLOCKED AT ALL TIMES.               │  │          │
│                                         │  │          │
└─────────────────────────────────────────┘  └──────────┘

GATEWAY TECHNOLOGIES — COPYRIGHT 1992 — ALL RIGHTS RESERVED
                                   ─── CPS-4000 ───
        ADD COPY EDIT DEL VIEW REPORT TOTAL QUIT
```

FIG. 9

```
───── SYSTEM CONTROL FILE ─────────────────────────────

ALLOW   30 CALL ATTEMPTS PER WEEK LOCAL.      ROLLOVER : SAT
ALLOW   30 CALL ATTEMPTS PER WEEK LD.         ROLLOVER : SAT

ALLOW    8 COMPLETIONS PER WEEK LOCAL.        ROLLOVER : SAT
ALLOW    8 COMPLETIONS PER WEEK LD.           ROLLOVER : SAT

ALLOW  240 MINUTES TALK TIME PER WEEK LOCAL.  ROLLOVER : SAT
ALLOW  240 MINUTES TALK TIME PER WEEK LD.     ROLLOVER : SAT
```

GATEWAY TECHNOLOGIES — COPYRIGHT 1992 — ALL RIGHTS RESERVED

──── CPS-4000 ────
ADD COPY EDIT DEL VIEW REPORT TOTAL QUIT

FIG. 10

SELECTIVELY ACTIVATED INTEGRATED REAL-TIME RECORDING OF TELEPHONE CONVERSATIONS WITH AUTOMATED DOCUMENTATION OF CONSENT TO CALL RECORDING

BACKGROUND OF THE INVENTION

1. Field of the Invention

This invention relates to the field of telecommunications, and more particularly to a system and method of automatically obtaining consent to the recording and/or monitoring of telephone calls, and the creation of persistent records of such consent.

2. Description of the Related Art

Currently there exist various systems for automatically recording telephone calls in facilities, such as correctional facilities, in response to various types of triggering events or conditions. U.S. Pat. No. 5,535,261 generally describes one such automated and integrated telephone call recording system, and is incorporated by reference herein.

One of the issues that now arise in the recording of telephone calls is a concern for the privacy rights of the calling and called parties. Various state and/or federal laws require that the consent of either the calling party, the called party, or both, be obtained in order to record or monitor a telephone call. This requirement pertains regardless of whether the telephone call is placed and recorded between two private telephones, or in a sophisticated integrated telephone call recording system, as described in the above referenced patent, or between such telephone system and a telephone connected to the Public Basic Telephone Network.

However, in the context of integrated telephone call recording systems, such as may be used in prisons, jails, or other detention facilities, the legal requirements for consent to recordation impose substantial administrative burdens and technical hurdles, without providing any specific details about how such consent should be obtained. The technical challenges include providing an efficient, fast, and robust system that can accommodate obtaining consent from different parties in any of a number of different languages. The ability to handle multiple languages is important since prisons house inmates speaking a variety of different languages. In order to meaningfully consent to recordation of a telephone call, an inmate calling party or a called party must be able to understand a request for consent in their own language. Administrative burdens include creating and maintaining credible records of which evidence of the parties' consent can be easily established without requiring lengthy testimony by records custodians. Again, the legal requirements do not define how a system is to satisfy these technical and legal requirements.

Accordingly, it is desirable to provide an automated system which provides prompts for consenting to the recording of a telephone call in a variety of languages, either automatically or at the selection of a party to the call, and which creates and maintains useful records which establish the consent of the various parties.

SUMMARY OF THE INVENTION

The preferred embodiment of the present invention operates in a telephone system for institutions such as jails and correctional facilities. It allows administrators to control and monitor the recording of telephone calls made by or to inmates, to automatically obtain their consent to the recording of such telephone calls, and provides computer-based records which evidence such consent.

In accordance with the present invention, there is provided a system and method for obtaining the consent of either a calling party, a called party, or both, to the recording or monitoring of a telephone call. The calling party places a telephone call to a called party by inputting a telephone number. The calling party also selects a language for hearing various prompts provided during processing of the telephone call. The telephone number and other parameters are checked to determine whether the telephone call may be recorded, or whether recording is prohibited. For example, the telephone number may be recorded in a file as being blocked for recording. Where recording is allowed, the calling party is prompted to consent to the recording of the telephone call. Where recording is not allowed, a prompt is played informing the calling party that the telephone call will not be recorded. The prompt is provided in the language selected by the calling party. An indication of which prompt was played and which language it was played in is stored in a call detail record for the telephone call. The telephone call is then placed to the called party.

A selection of a language for prompting the called party is made. The selection may be made by the calling party, by a system administrator, or by the called party. Alternatively, a number of prompts in different languages may be played so that a specific language selection is not required. Also, a previous language selection by a called party may be stored and used to select the language for prompts on subsequent telephone calls. An indication of which prompt was played to the called party, and in which language, is preferably stored in the call detail record. The called party's response to the prompt, such as consenting to the recording of the telephone call, is also preferably stored in the call detail record.

Recording of the telephone call, if allowed, then takes place upon the occurrence of certain defined triggering events. If recording is not allowed for whatever reason, then the triggering events do not cause recording. In an alternative embodiment, even if recording is prevented, for example, the telephone number being blocked for recording, the system administrator can issue a command over a network to initiate recording of the telephone call, and override the blocking restriction. Thus the network commands can override blocking restrictions on the telephone number.

In this manner, the system provides for automated management of consent to the recording of telephone calls. The present invention accommodates different legal requirements, including those that require the consent of the calling party, both the calling and called party, or neither party. The call detail record, preferably storing the identification of which prompts, languages, and the responses of the parties, provides a useful record of these facts. The call detail record can be easily authenticated in a legal proceeding if necessary to prove consent to the telephone recording.

The present invention may be embodied in computer executable software which provides the various functions of establishing telephone calls, selecting languages for prompts to the calling and called parties, prompting the calling and/or called party for consent to recording of the telephone call, and recording inputs indicating consent or refusal to recording of the telephone call. The present invention also encompasses a call detail record, persistently stored in a computer readable medium, which stores data for a telephone call to a telephone number indicating which prompts were played to the calling party and/or called party (e.g. prompts either requesting consent or informing that the telephone call will not be recorded), what language the prompts were played in, and whether the calling and/or called party gave consent to recording, if required.

BRIEF DESCRIPTION OF THE DRAWINGS

FIG. 3A is a sample Main Screen of the preferred embodiment of the invention.

FIG. 3B is a sample Secondary Screen of the preferred embodiment of the invention.

FIGS. 4A and 4B are sample entry screens for the System Parameter File.

FIGS. 5A, 5B, 5C, and 5D are sample entry screens for the Channel Parameter File.

FIG. 6 is a sample entry screen for the Number Control File Showing the Block Recording field.

FIG. 7 is a sample entry screen for the NPANXX Control File.

FIG. 8 is a sample entry screen for the NPA Control File.

FIG. 9 is a sample entry screen for the NXX Control File.

FIG. 10 is a sample entry screen for the Fraud Control Parameter File.

DESCRIPTION OF THE PREFERRED EMBODIMENT

Figure 1:
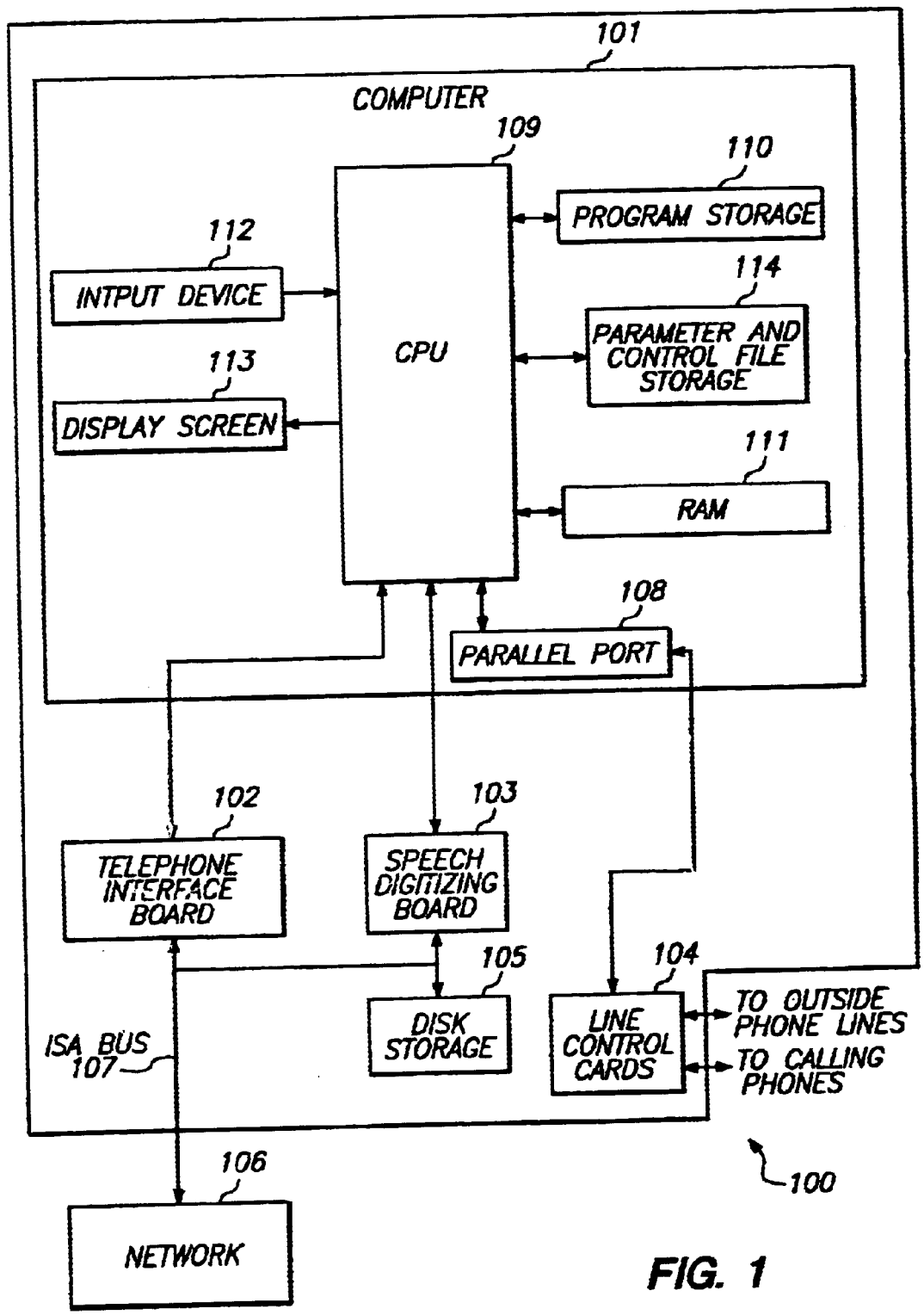
FIG. 1 is a block diagram of the preferred embodiment of the invention.

The preferred embodiment of the present invention operates as an integral part of a telephone system such as the CPS-4000 offered by Gateway Technologies, Inc. Referring now to FIG. 1, there is shown a block diagram of a typical hardware environment for the present invention. The CPS-4000 telephone system 100 includes a standard personal computer 101, together with a conventional telephone interface board 102 and a speech digitizing board 103. Such boards are available from companies such as Dialogic, Rhetorex, and PIKA. Boards 102 and 103 are connected to disk storage 105 and (if desired) a network 106 via a conventional ISA bus 107. System 100 also includes line control cards 104 for providing switching and access control for the outside telephone lines and for calling phones connected to system 100. Cards 104 are connected to computer 101 via a parallel port 108.

Computer 101 contains central processing unit (CPU) 109 that runs software program instructions, stored in program storage 110, which direct CPU 109 to perform the various functions of system 100. Parameter and Control File Storage 114 stores information that is used by CPU 109 in performing the program instructions, as described below. Storage 114 is also preferably used for persistent storage of call detail records for the telephone calls. Random access memory (RAM) 111 is used as workspace while performing program instructions and other functions. The system administrator interacts with system 100 by supplying commands via one or more user input devices 112 (such as a keyboard, mouse, and the like). The system administrator can also control the system from a remote location over network 106. A display screen 113 may be used to provide status information and to prompt the administrator for commands.

In the embodiment illustrated herein, the hardware elements of computer 101 are conventional components of a personal computer or workstation. The inventive aspects of the present invention lie primarily in the software instructions, stored in program storage 110, that control the hardware elements shown in FIG. 1, and the control and parameter files stored in 114.

Referring now to FIG. 2, there is shown a flow chart of the overall operation of the system in accordance with the present invention. First, an administrator specifies 202 which telephone lines will be subject to recording, and identifies particular events that will trigger recording. The administrator also establishes consent parameters specifying whether consent is required by calling party, the called party, both, or neither. The administrator also establishes default conditions for selecting which language prompts will be used for obtaining consent to recording of telephone calls. This is done under software control, using input devices 112 and display screen 113 to modify control information as will be described in more detail below. These conditions are set in various flags, which are referenced during operation, as described with respect to FIGS. 13A–13D, below.

Figure 2A:
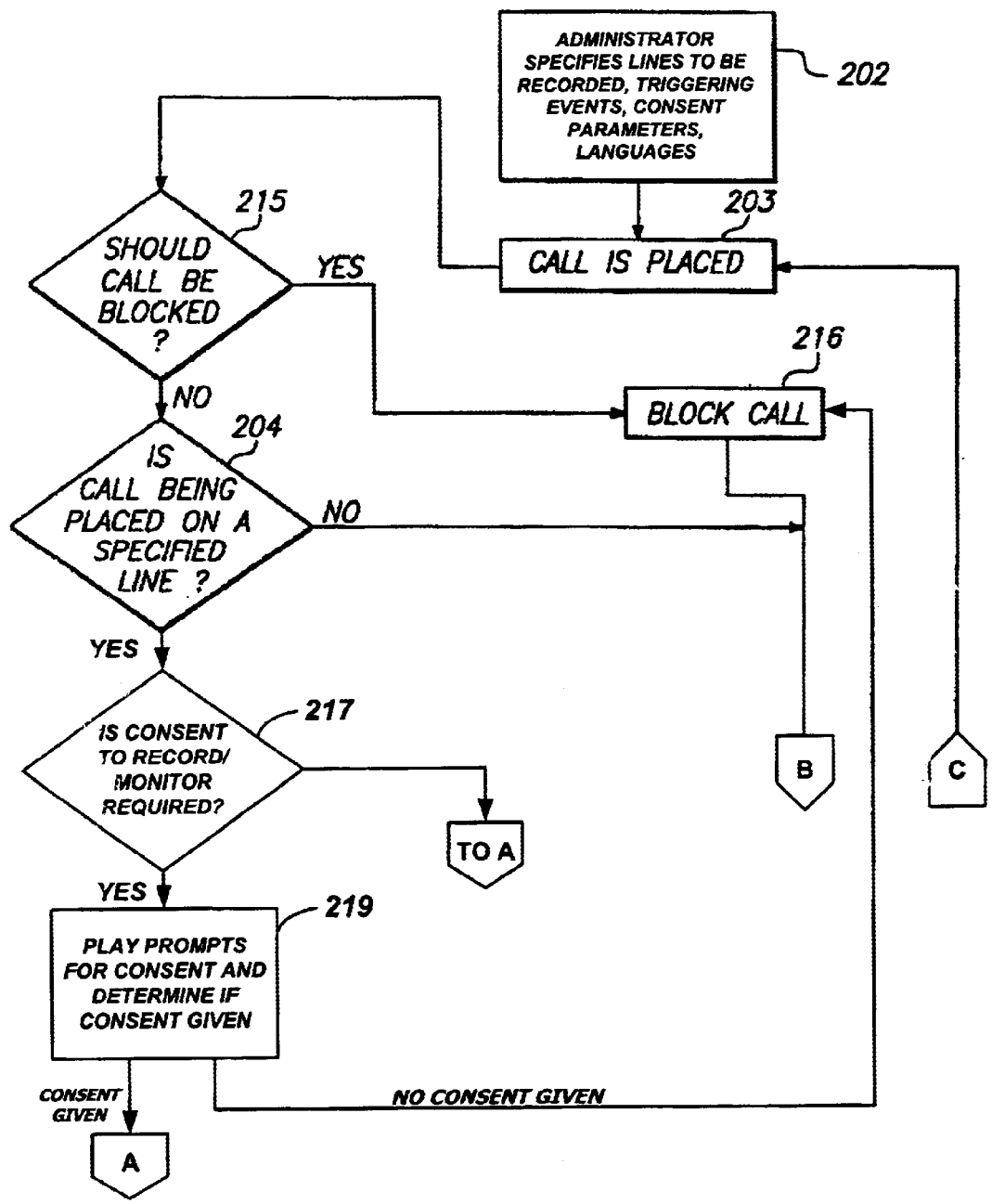
FIGS. 2A and 2B are a flowchart showing the overall operation of the invention.
Figure 2B:
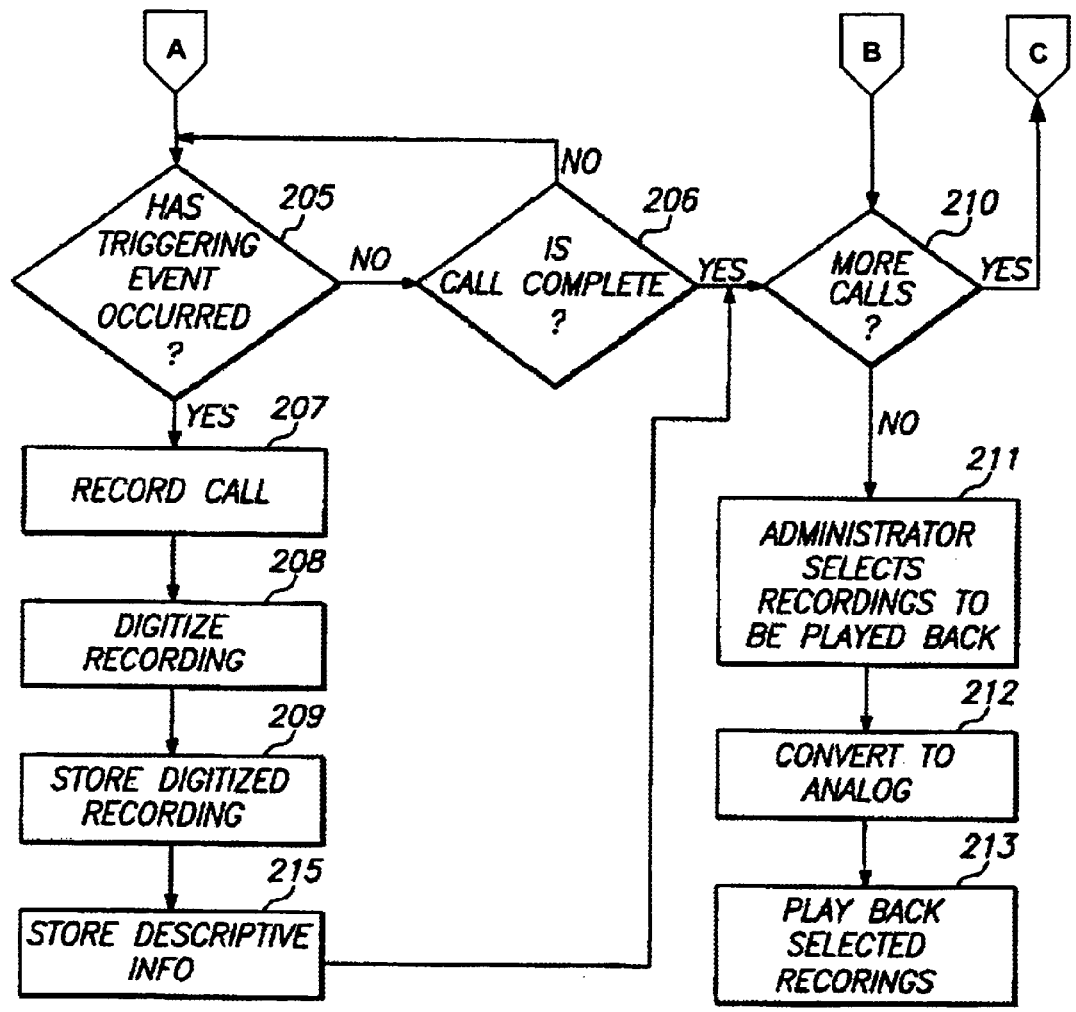

For each call made by or to an inmate, steps 203 to 216 as shown in FIGS. 2A–2B are performed.

The call is placed 203. The CPS-4000 system software automates this step. In processing the call, the system checks control and parameter files as described below, in order to determine whether the call should be blocked 215. If so, the call is blocked 216.

Then, the system checks 204 whether the call is being placed on a line that was specified for recording by the system administrator. This is done by checking control and parameter files as described below. If the line has been specified for recording, the system proceeds to step 217. If not, the system proceeds to step 210.

The system determines 217 whether consent is required for recording or monitoring of the telephone call. This determination is made from the consent parameters set by the system administrator generally, and/or for the particular telephone number being dialed for the telephone call. If consent is not required, the system continues at step 205, below.

If consent is required, the system plays 219 the appropriate prompts in a selected language to either or both the calling party and called party, as required by the consent parameters and using default language selections, and determines whether consent is given. If consent is given the system continues at step 205. If consent is not given, the system block 216 the telephone call.

The system then waits until either a triggering event occurs 205 or the call is completed 206. In order to determine whether a triggering event has occurred, the system consults parameter and control files 114, which contain definitions and specifications as to which events should trigger recordings, as described below. The system also monitors activity on the telephone line to check whether any of the specified triggering events has occurred.

In an alternative embodiment of the present invention, trigger events are also received over the network 106 in the form of network commands issued by, for example, a system administrator. Thus, if a call is not being recorded, but during the call process, it is observed that the call may be important and that recording the call could be beneficial, then the system administrator can override the issue a network command to trigger the recording of the call. These network commands can override any existing parameters in the number control file which would have otherwise prevented recording of the telephone call.

If the call is completed before a triggering event occurs, the system proceeds to step 210. If a triggering event occurs first, the system records the call 207, digitizes the recording 208, stores the digitized recording 209, and stores descriptive information regarding the call 215.

If there are more calls to be processed 210, the system returns to step 203. If not, the administrator may select recordings 211 to be played back. This is done under software control, using input devices 112 and display screen 113 to view information describing stored recordings and to select recordings. Selected recordings are converted 212 from digital form to analog, and the system then plays them back 213.

Figure 11:
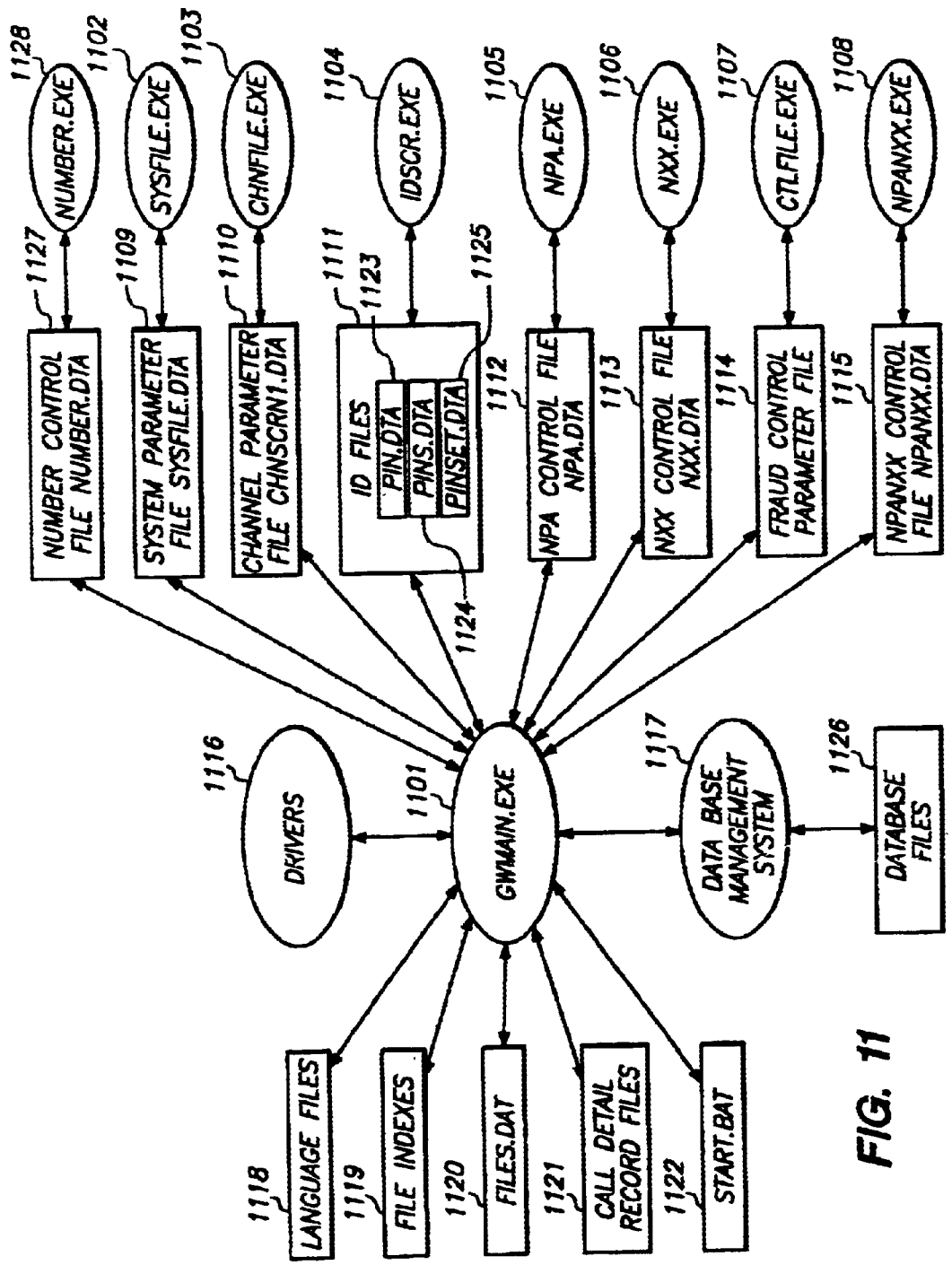
FIG. 11 is a block diagram of the software organization of the system.
Figure 12A:
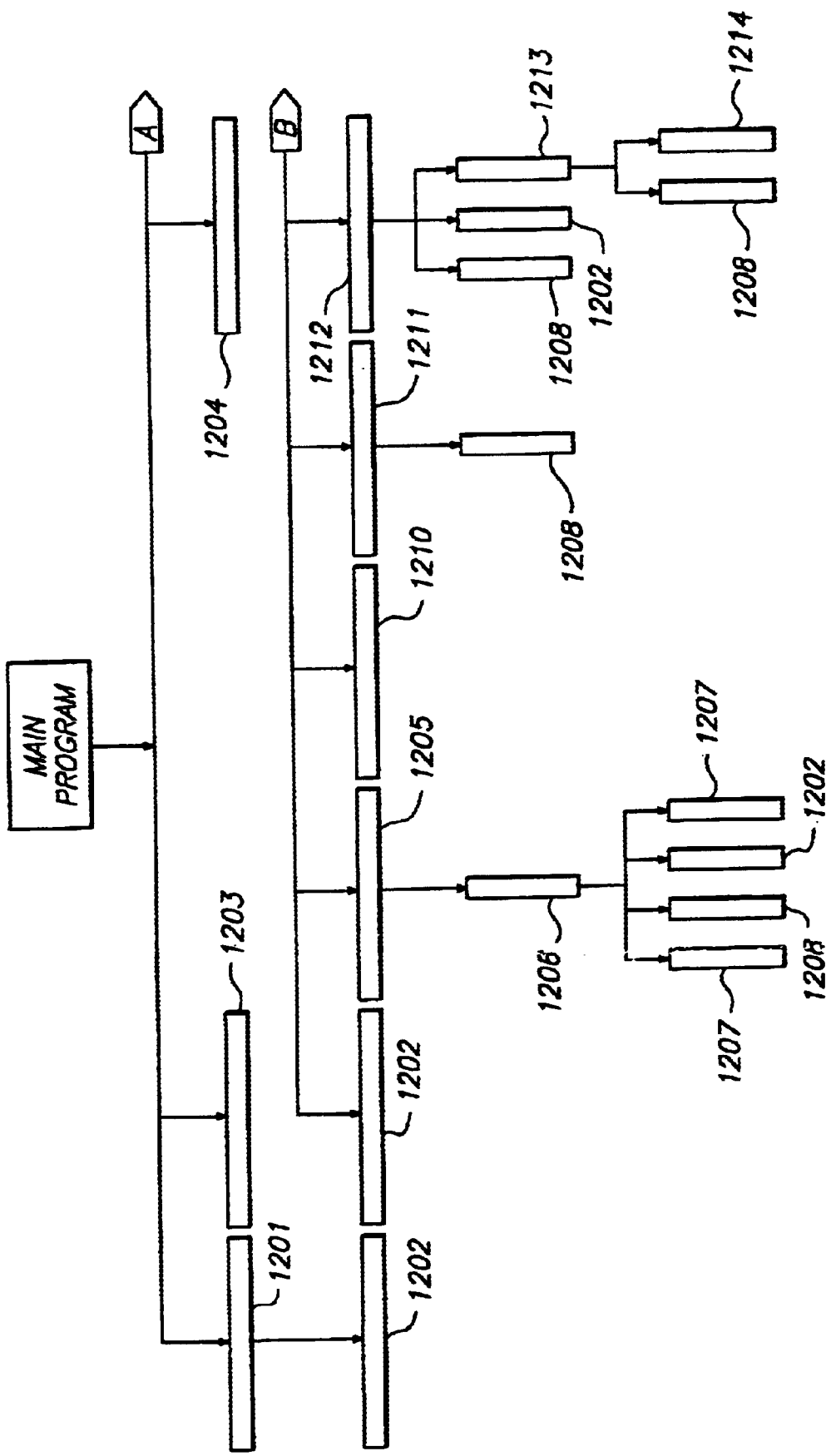
FIGS. 12A to 12H show the structure of GWMAIN.EXE.
Figure 12B:
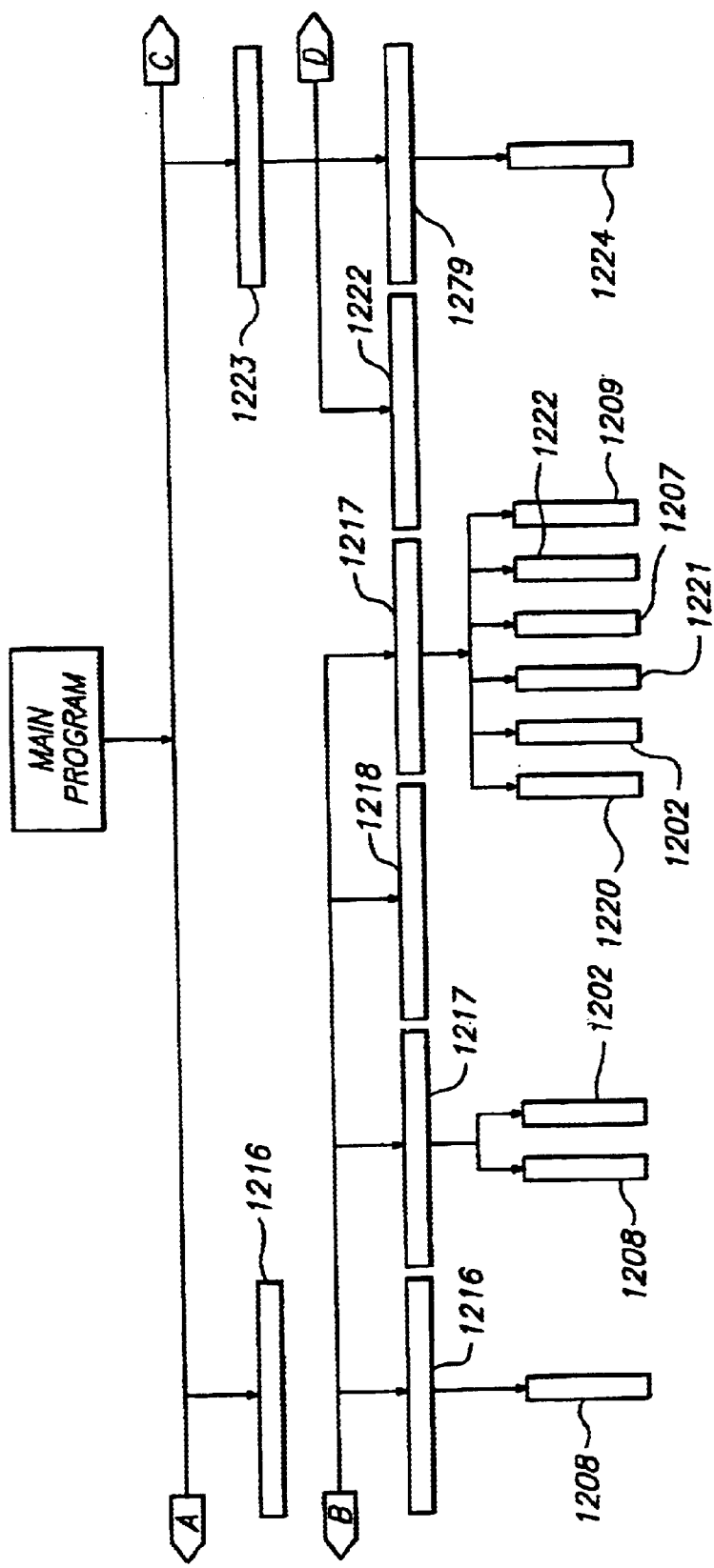
Figure 12C:
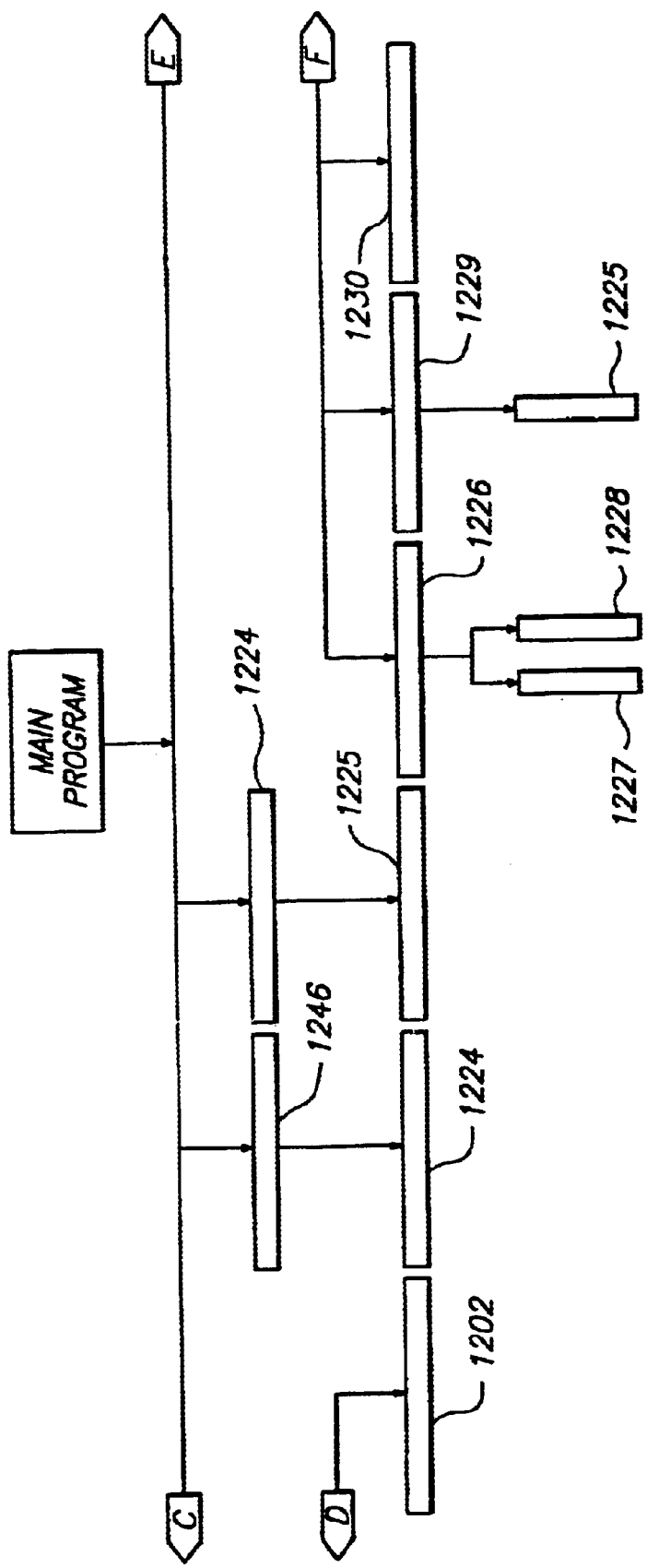
Figure 12D:
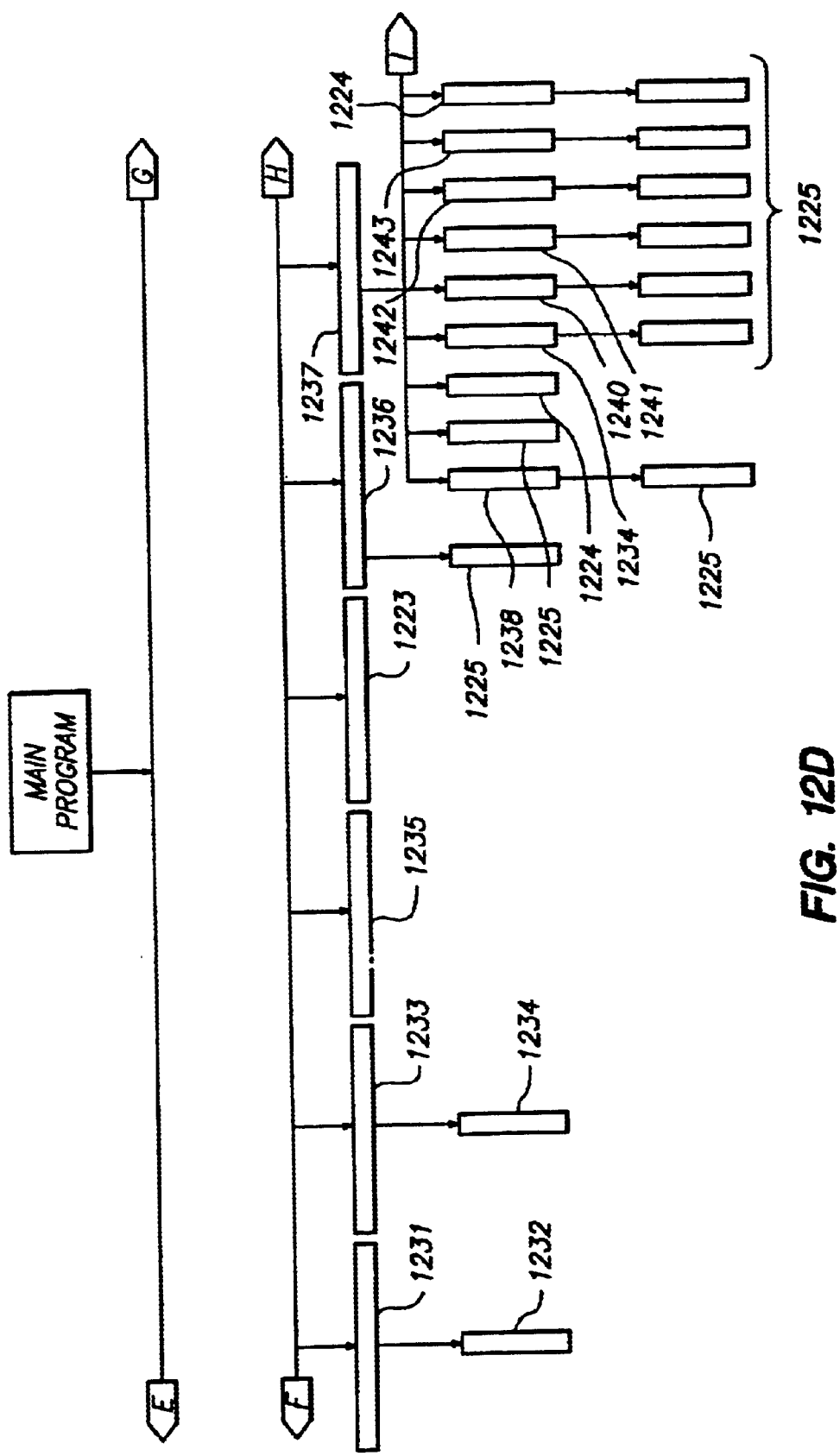
Figure 12E:
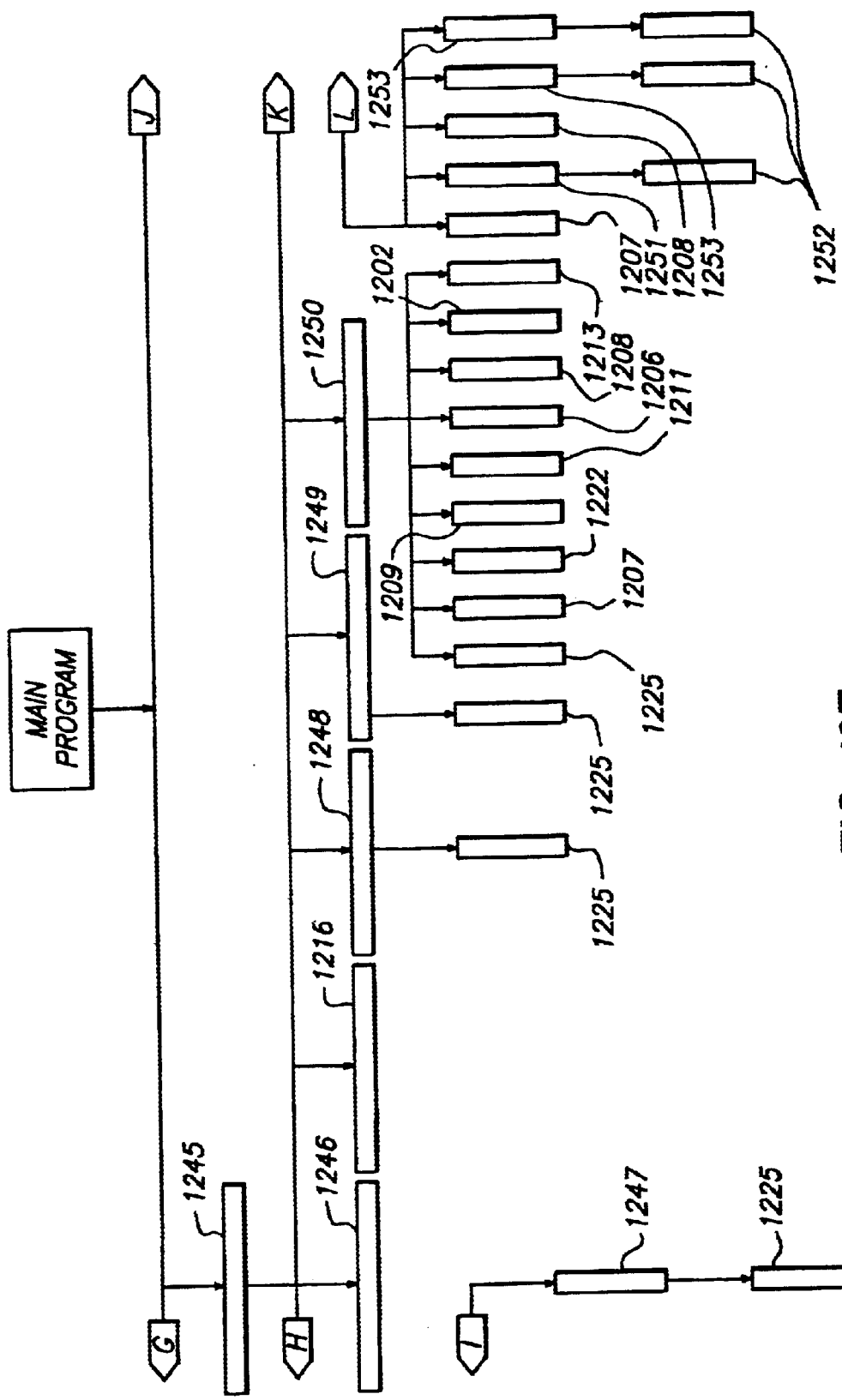
Figure 12F:
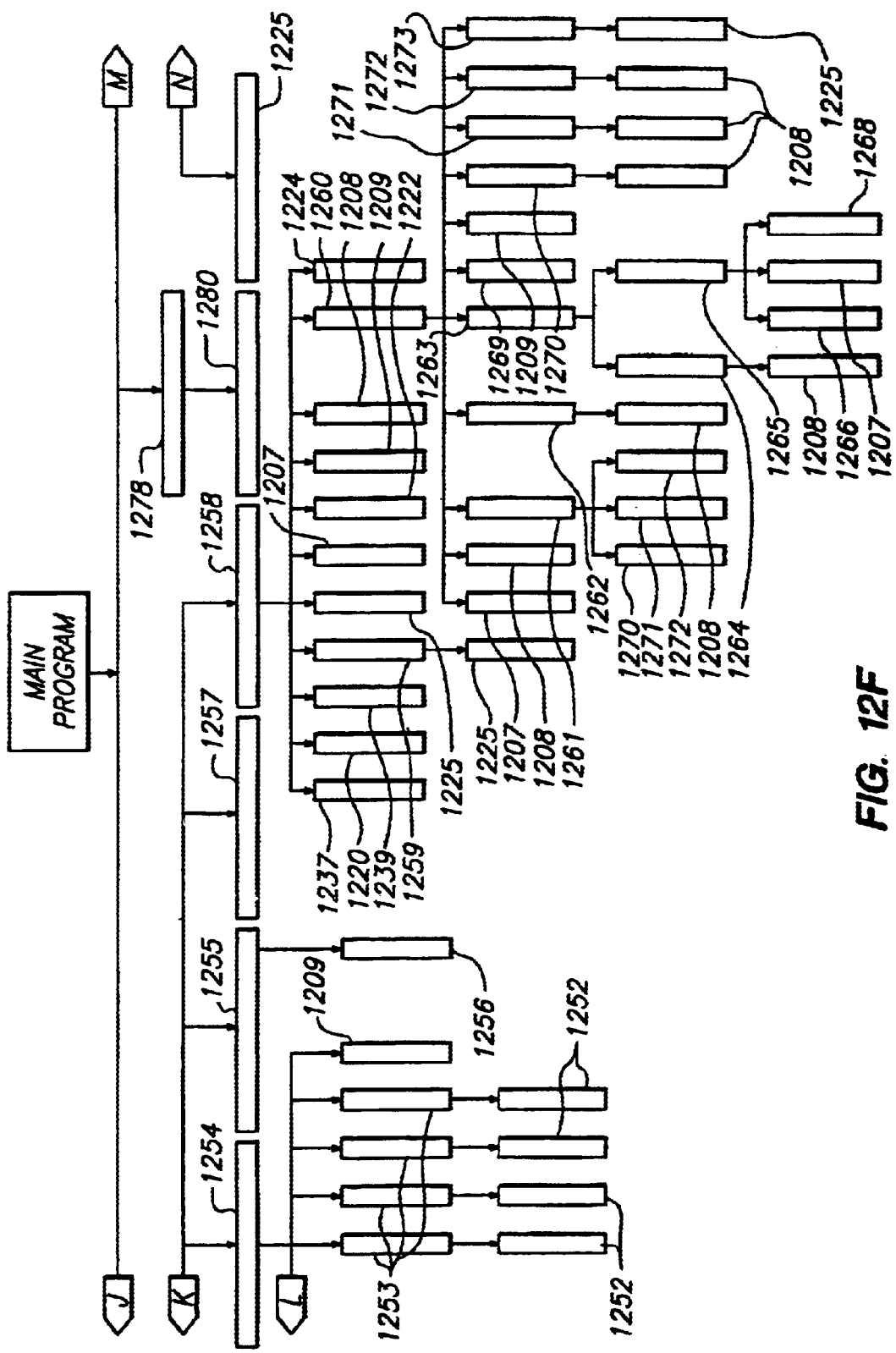
Figure 12G:
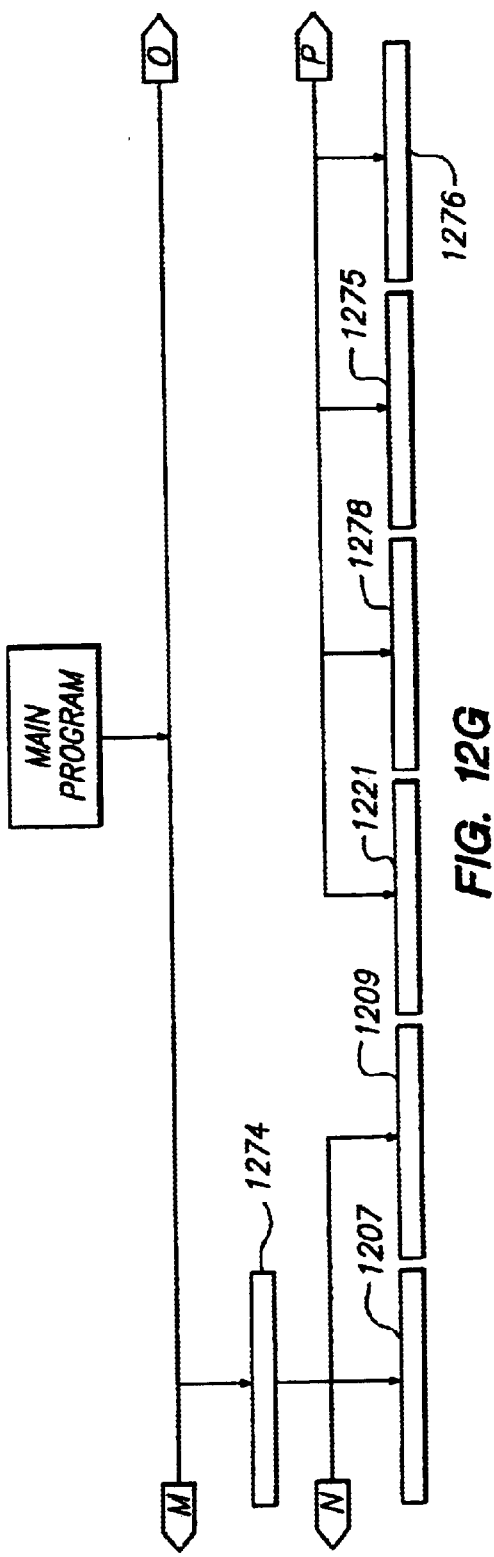
Figure 12H:
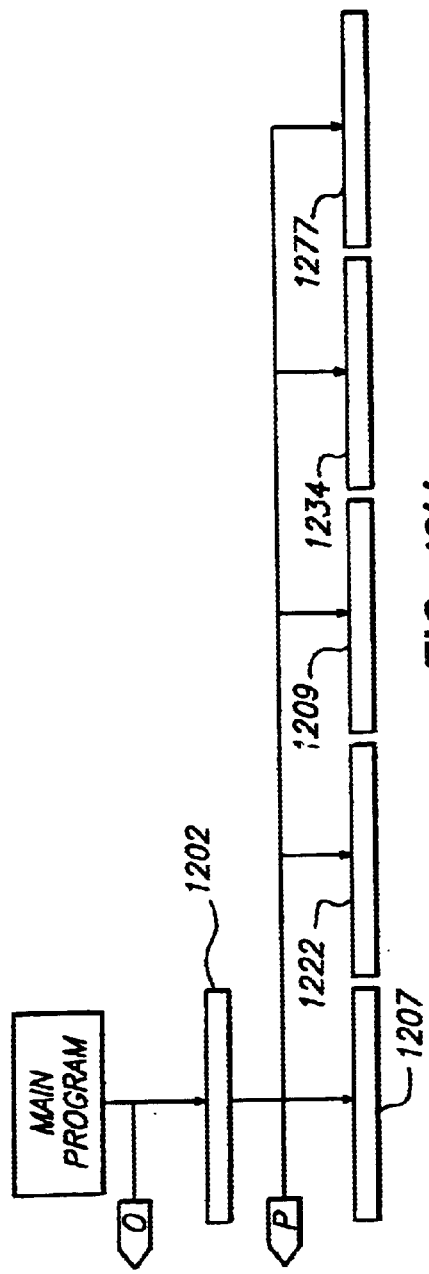
Figure 13A:
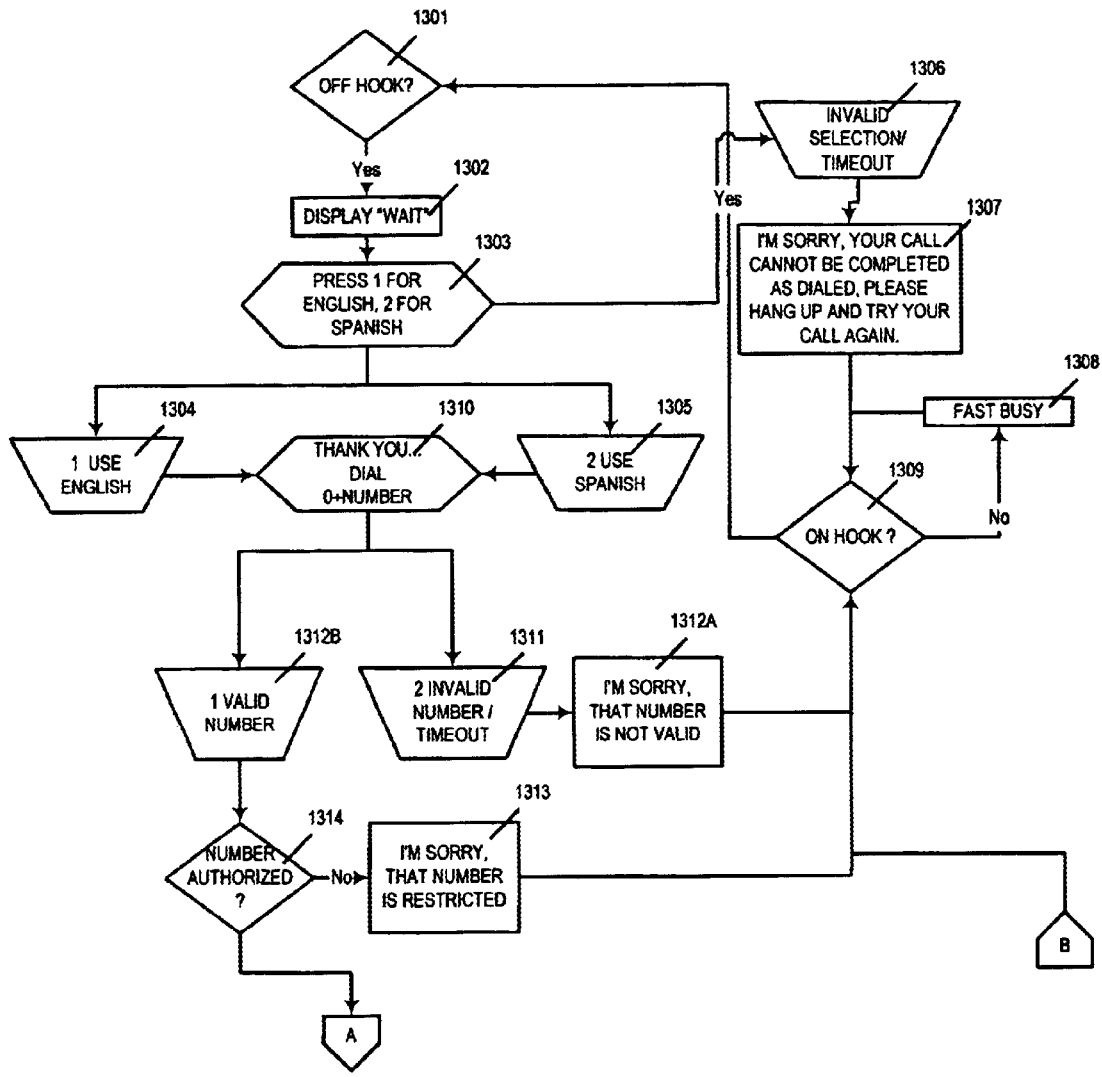
FIGS. 13A 13B, 13C, and 13D are a flowchart showing the operation of GWMAIN.EXE.
Figure 13B:
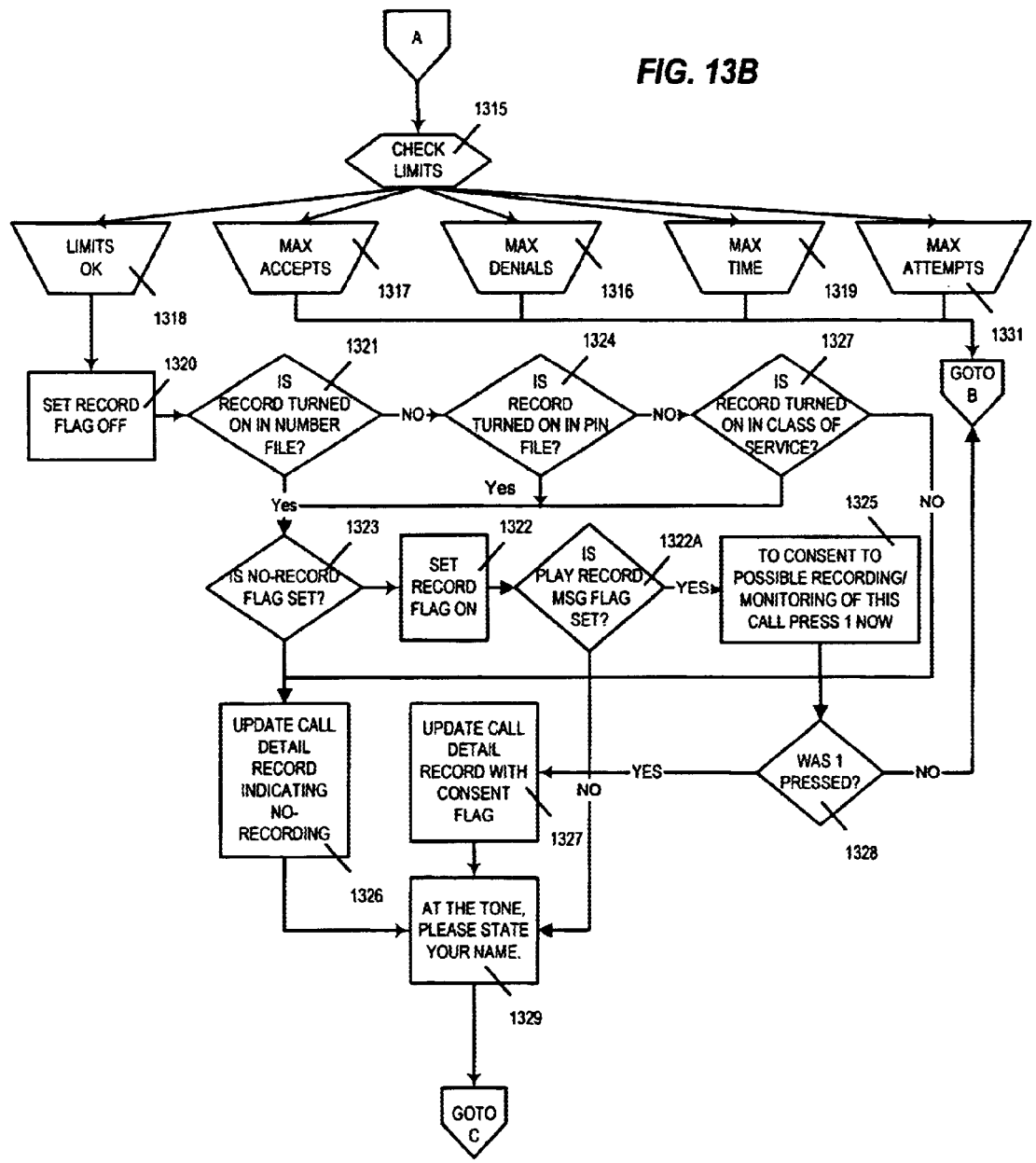
Figure 13C:
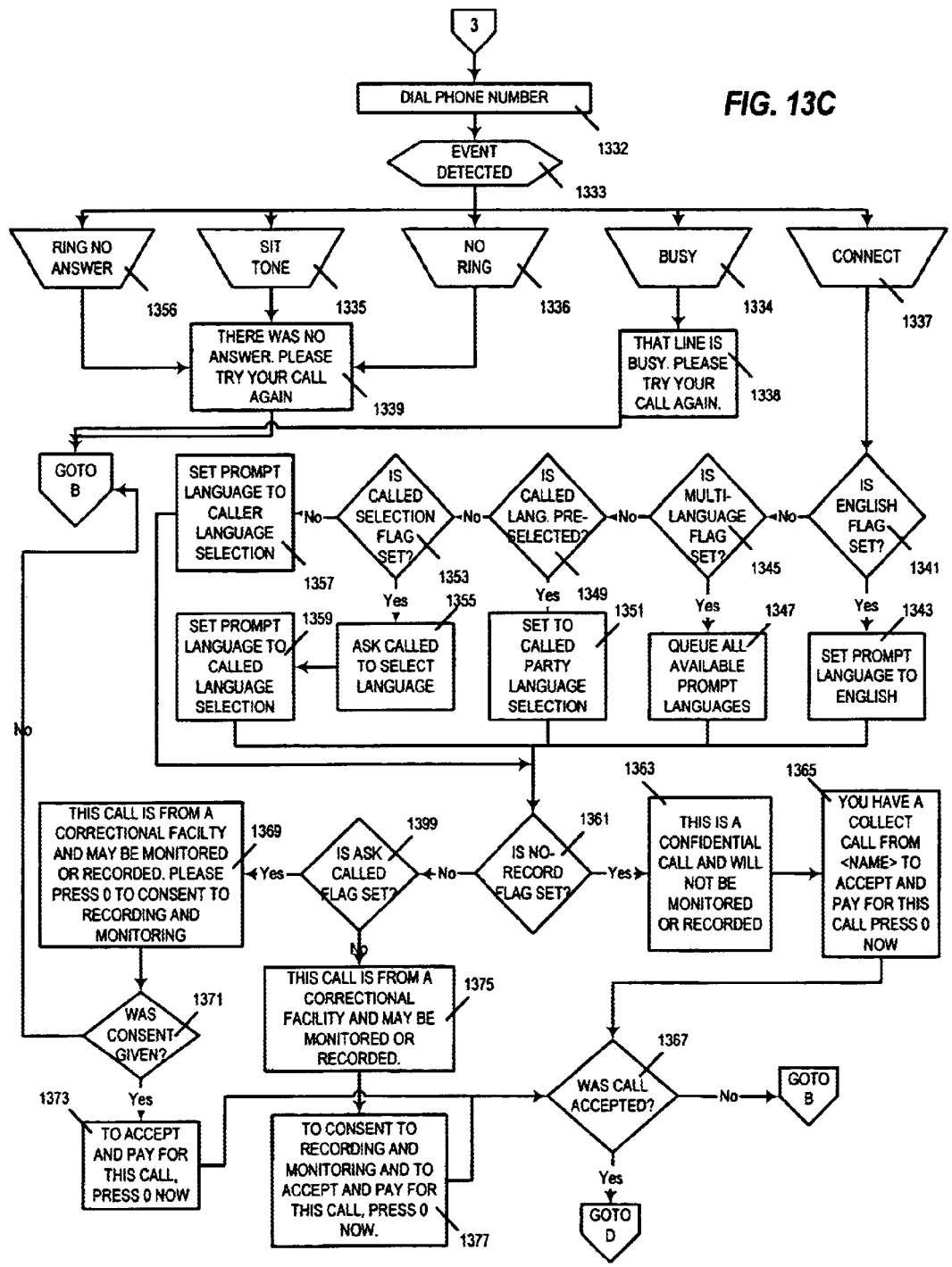
Figure 13D:
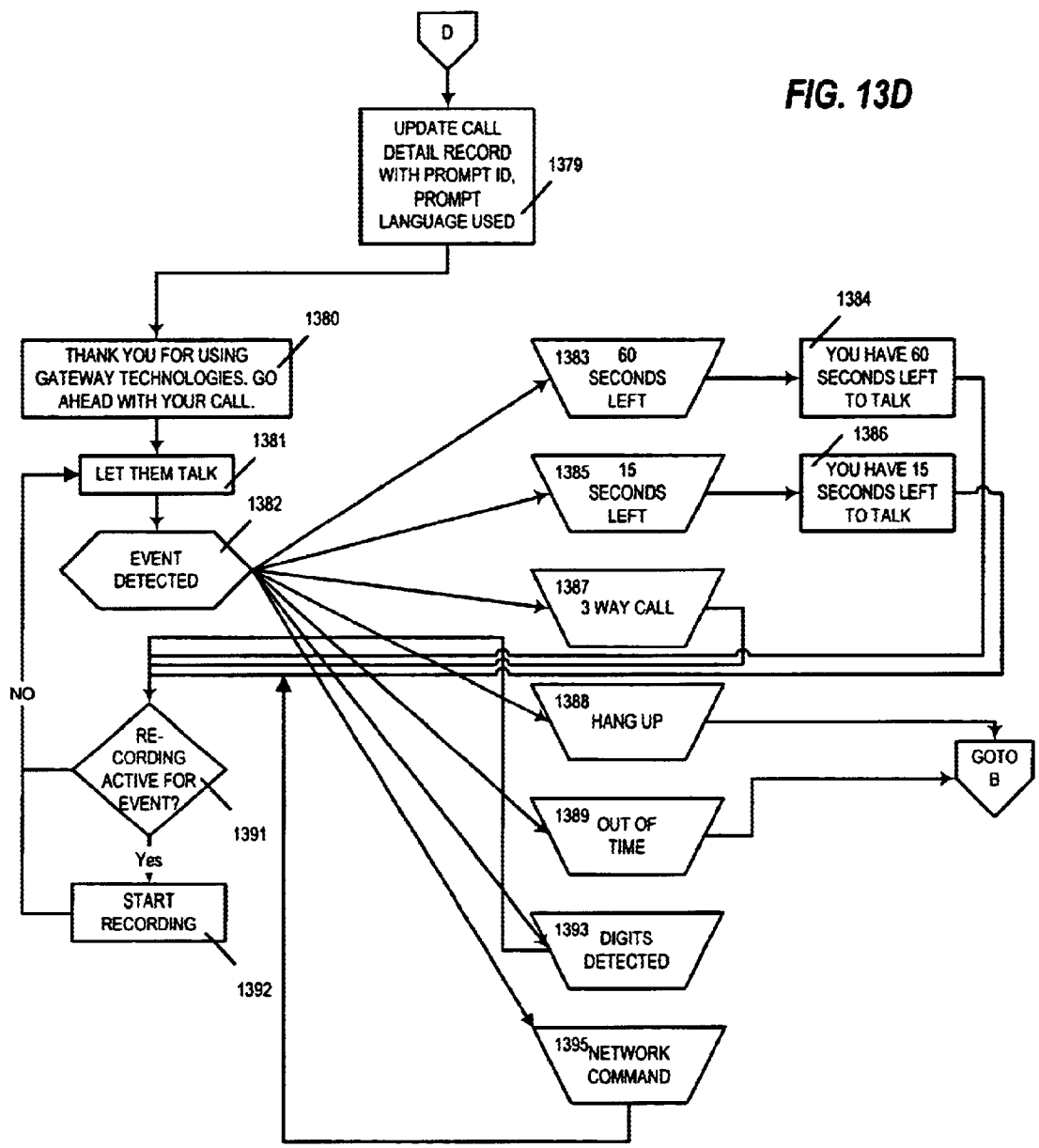

In the preferred embodiment, the above steps are performed under the control of software programs that are stored in program storage 110. Referring now to FIG. 11, there is shown the organizational structure of the software programs and associated files. The software programs include a main program, GWMAIN.EXE 1101, and eight support programs: SYSFILE.EXE 1102, CHNFILE.EXE 1103, IDSCR.EXE 1104, NPA.EXE 1105, NXX.EXE 1106, CTLFILE.EXE 1107, NPANXX.EXE 1108, and NUMBER-.EXE 1128. The support programs are used to provide administrator access to parameter and control files, as shown in FIG. 11: System Parameter File SYSFILE.DTA 1109, Channel Parameter File CHNSCR1.DTA 1110, ID Files 1111, NPA Control File NPA.DTA 1112, NXX Control File NXX.DTA 1113, Fraud Control Parameter File 1114, NPANXX Control File NPANXX.DTA 1115, and Number Control File NUMBER.DTA 1127.

ID Files 1111 include three components: PIN.DTA file 1123 containing information about the inmates; PINS.DTA file 1124 containing information about the allowed numbers for the inmates, including whether recordings should be made for particular numbers when called by particular inmates; and PINSET.DTA file 1125 containing Class of Service information that can be used to selectively activate recordings based on the selection of the Class of Service for the telephone call. These files are used for validation of the called number and to set certain parameters during the call. Specifically, these files contain fields that activate the digital recording feature automatically if the system administrator has indicated that recordings are to take place. Thus, recordings can be made for particular called numbers, particular inmates placing calls, or by a combination of the two parameters. The system administrator can also control recordings on a line-per-line basis using a keyboard function key.

Also included are: drivers 1116 such as Dialogic D40, for providing communication between the Disk Operating System (DOS) of computer 101 with boards 102 and 103; a database management system 1117 such as Btrieve, for maintaining database files 1126, various language files 1118 including, among other things, prompts and messages recorded in various languages, file indexes 1119; and a files configuration file named FILES.DAT 1120.

A DOS batch file called START.BAT 1122 initializes the required drivers, namely D40DRV.EXE and BTRIEVE.EXE in the preferred embodiment. START.BAT 1122 also selects the desired operating characteristics of GWMAIN.EXE 1101 by the use of command line parameters. The following is a representative list of command line parameters that may be used in the preferred embodiment:

v=display version number and exit
b=Gateway Line Interface boards are being used
r=this implementation is allowed to make recordings
px=use parallel port x for communication with the Line Interface Boards
d=turn off DTMF detection
l=no loop current extenders on boards
f=turn off full reporting on F7 display
c=concentrator in use
e=screen saver turned on
a=allow Free call cut-through without wait for answer detection
x=switch relays on messages for Rhetorex boards
0=single zero DTMF detection enabled The following is a typical START.BAT file 1122:
@ echo off
d40drv-e512
btrieve/p:4096/f:32/m:64
gwmain-r-b-p1

Language files 1118 are ADPCM compressed, digitized voice prompts stored in a standard DOS file. This file is then indexed using file indexes 1119 to allow access to each of the voice prompts within the file. The voice prompts include various prompts for requesting consent to recording or monitoring of telephone calls and various messages to inform whether recording and/or monitoring may be performed during a call. In the preferred embodiment, language files 1118 are designated as english.vox and spanish.vox, and file indexes 1119 are designated as index.1, index.2, etc. Additional language files and file indexes may also be provided.

Figure 14:
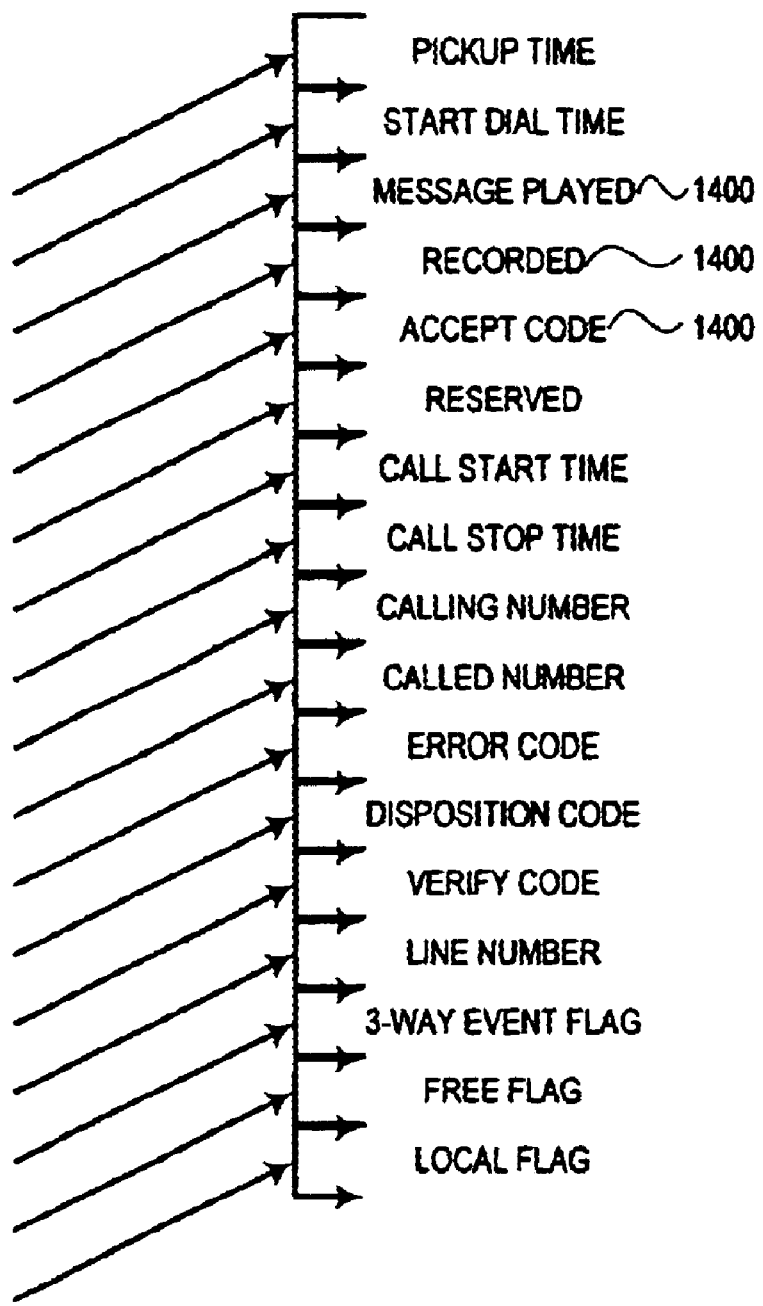
FIG. 14 is an illustration of the call detail record.

In the preferred embodiment, descriptive information concerning calls is placed in output files called Call Detail Record (CDR) files 1121. These files are stored on drive "D:" in a subdirectory called CDR. The files include information such as start time, stop time, calling number, called number, user id, call disposition codes, error codes, and validation codes. FIG. 14 illustrates the structure of a call detail record. Persistent storage of the call detail records allows for subsequent retrieval and authentication to establish whether a particular telephone call was recorded, and if so, whether consent was given, and in which language prompts were played for such consent. In a preferred embodiment, the clock used to generate timestamps for the call detail record is synchronized with the system clock that is part of the call processing system which generates a call log of each telephone call that is made. In this manner, the call log record of when a telephone call was made can be easily matched against the call detail record to show that consent was given for recording that telephone call, since the times in both records are matched.

Database files 1126 include other files used by the system, including: .nme, for storing user names during call progress; .cnrm, for storing called party names for person-to-person collect calls; EMERG.LOG, for storing information about emergency calls made within the facility using an internal alarm system; RECORD.LOG, for storing information about recordings; DEBUG.DTA, for storing debugging data; and .nbr, for storing callback numbers. The designation " "

refers to a number indicating a particular telephone line. Thus, for example, the name for line 15 would be stored in file 15.nme.

FILES.DAT 1120 is a data file used by the system to determine the location of necessary files for GWMAIN.EXE 1101. For each file needed by the system, FILES.DAT 1120 lists a file identifier and a path indicating the location of the file in Parameter and Control File Storage 114. The following is a typical FILES.DAT file 1120:

NUMBER, d: number number.dta
SYSTEM, sysfile.dta
CHANNEL, chnscr1.dta
GRID, idscr.dta
NXX, nxx.dta
NPA, npa.dta
NPANXX, npanxx.dta
INDEX1, c: main speech index.1
INDEX2, c: main speech index.2
INDEX3, c: main speech index.3
INDEX4, c: main speech index.4
LNG 1, c: main speech english.vox
LNG2, c: main speech spanish.vox
CDR, d: cdr
RECORD, d: recs Recordings are stored in disk storage 105 at a location specified by the RECORD identifier of FILES.DAT 1120.

GWMAIN.EXE 1101

GWMAIN.EXE 1101 is the main program for controlling the operation of the system. GWMAIN.EXE 1101 is an event-driven, real-time, multitasking program that runs in conjunction with MS-DOS 5.00. It is modular in design, allowing for control of complex functions while facilitating program maintenance and updates for future applications. GWMAIN.EXE 1101 uses parameter files and control files 1109–1127 that can be easily changed to maximize flexibility and ease of support.

The structure of GWMAIN.EXE 1101 is shown in FIGS. 12A–12H. Each of the items shown in these figures is described in Table 1 below:

TABLE 1

| Routine Reference Number | Description |
| --- | --- |
| chkargs 1201 | Parses command line parameters, sets global variables based on parameters |
| sysexit 1202 | Closes all files, writes closing CDR record, shuts down all lines, exits from program |
| get--fnames 1203 | Reads and parses FILES.DAT file |
| sysinit 1204 | Initializes device drivers, opens files, initializes all lines and variables |
| get--system--info 1205 | Reads in SYSFILE.DTA information |
| setup--dcb 1206 | Initialized Device Control Block using information from SYSFILE.DTA |
| set--idle--flag 1207 | Sets flag to force serialization of DOS commands such as disk reads/writes - will not set flag or allow further operation on the line while flag is set |
| write--btrv--log 1208 | Writes error log on any error during use of a database file |
| clear--idle--flag 1209 | Resets DOS serialization flag |
| curoff 1210 | Turns off screen cursor |
| get--lcctrl--info 1211 | Reads LCCTRL.DTA file |
| get--channel--info 1212 | Read CHNSCRL.DTA file - sets up channel parameter block using read information |
| read--file 1213 | Read information from CHNSCRL.DTA file |
| move--data--in 1214 | Move channel information into Channel Parameter Block |
| start--clock 1215 | start interrupt driven clock and time and date display |
| commissary--active 1216 | Compares current date/time with Commissary setup and sets/resets commissary open flag |
| open--btrv--files 1217 | Opens database files for use by the system |
| open--other--files 1218 | Opens speech files |
| setup--channels 1219 | Initializes each line |
| getch1 1220 | Waits for key press |
| setport 1221 | Sets relays on Line Interface board via parallel port |
| write--cdr 1222 | Writes CDR record into daily CDR file |
| check--time 1223 | Synchronizes PC clock with CMOS "real-time" clock, checks to see if upload files needs to be checked, screen displays updated |
| disp--msg 1224 | Displays line status information on screen |
| disp 1225 | Routine to write text directly to video memory |
| check--loop--current 1226 | Checks Line Interface Board to see if loop current change has occurred |
| check--inside 1227 | Checks inside line loop current |
| check--outside 1228 | Checks outside line loop current |
| check--loop--drop--time 1229 | Checks length of loop current drop |
| check--for--phone--onhk 1230 | Checks to see if inside phone is on-hook |
| blank--screen 1231 | Screen saver routine |
| displ 1232 | Routine to write text directly to video memory and ignore screen updates while screen is blanked |
| check--reboot--okay 1233 | Makes sure that no lines are in use |
| reboot 1234 | reboots system |
| check--random 1235 | Checks to see if random interval has elapsed for playing anti-fraud messages |
| display--debug--screen 1236 | displays screen of information useful during debugging |
| display--current--screen 1237 | redraws current screen |
| disp--screen1 1238 | displays primary screen |
| rst--bottom 1239 | clears system message area of screen |

TABLE 1-continued

| Routine Reference Number | Description |
| --- | --- |
| disp--screen2 1240 | display secondary screen |
| disp--calls 1241 | displays call count information on secondary screen |
| disp--okay 1242 | displays okay count information on secondary screen |
| disp--deny 1243 | displays denied count information on secondary screen |
| disp--bad 1244 | displays bad count information on secondary screen |
| waitevt 1245 | main loop - waits for event to be reported back from device drivers |
| check--for--out--of--service 1246 | checks to see if out-of-service time has occurred |
| disp--screen3 1247 | displays third screen |
| display--screen--msgs 1248 | displays call progress information |
| disp--screen3--data 1249 | displays third screen information |
| check--for--uploads 1250 | checks to see if upload file exists |
| parse--num--rec 1251 | parses number record from upload file and updates NUMBER.DTA |
| strtok1 1252 | parses string based on comma delimiter |
| parse--??????--rec 1253 | parses specified record type from upload file and updates local files |
| get--upload--records 1254 | reads upload records from upload file |
| time--change--check 1255 | checks to see if daylight savings time change is needed |
| lines--open 1256 | used by time--change--check to make sure no lines are being used when time is changed |
| kbhit1 1257 | routine that tells if key has been pressed |
| get--input 1258 | read keyboard and perform commands |
| clr--bottom 1259 | clear System Messages area |
| new--verify 1260 | verify called number using local tables |
| check--blockcode 1261 | check NUMBER.DTA, NPANXX.DTA, NPA.DTA and NXX.DTA files for block code |
| check--for--number 1262 | verifies that number is in NUMBER.DTA |
| check--limits 1263 | checks to see that fraud limits have not been exceeded |
| get--cos--limits 1264 | get class of service limits from file |
| check--rollover 1265 | see if fraud limits should be rolled over |
| to--julian 1266 | converts MM/DD/YY to Julian date |
| from--julian 1267 | converts Julian date to MM/DD/YY |
| dow 1268 | returns day of week |
| set--call--parameters 1269 | sets record, alarm, etc. based on data in NUMBER.DTA |
| check--npanxx 1270 | checks number in NPANXX.DTA file |
| check--npa 1271 | checks number in NPA.DTA file |
| check--nxx 1272 | checks number in NXX.DTA file |
| disp-sys--msg 1273 | displays message in system message area of screen |
| prt--codes 1274 | prints debugging codes on screen |
| stop--clock 1275 | turns off real time clock and time and date display |
| watch--dog--long 1276 | sets hardware watchdog to 30 minutes |
| curon 1277 | turns cursor on |

When GWMAIN.EXE 1101 runs, it accepts command line parameters specifying various options and configurations, including:

Specification of the type of interface boards 102, 103 and line control cards 104 being used;

Specification of which port to use to communicate with line control cards 104;

Specification of interrupt lines for boards 102, 103; and

Enablement of DTMF detection during a call (to terminate the telephone connection when certain digits are dialed during a call).

As described above, command line parameters are specified in a DOS batch file named START.BAT 1122 that initializes the system by loading GWMAIN.EXE 1101 in a conventional manner.

Referring now to FIGS. 13A to 13D, there is shown a flowchart of the operation of GWMAIN.EXE in the preferred embodiment.

The system checks 1301 to see if the telephone is off-hook. If so, it displays "WAIT" 1302. Then, it prompts 1303 the calling party to select a language for playing various prompts, including prompts regarding whether the telephone call may be recorded. If the calling party presses "1", the system uses 1304 English; if the user presses "2", the system uses 1305 Spanish. Additional languages beyond English and Spanish may also be offered, with corresponding input numbers, and decoding logic. If the user presses "3" or an invalid selection, or if there is a timeout, the system considers this to be an invalid selection 1306, informs the user that the call cannot be completed 1307, checks that the calling party has hung up, 1309, and if not, sounds a "fast busy" signal 1308, until the phone is hung up, and returns to step 1301.

After a language has been selected, the system prompts the calling party 1310 to dial a telephone number. If the calling party dials an invalid number or there is a timeout 1311, the system informs the calling party that the telephone number is not valid 1312A, checks that the calling party has hung up 1309, and returns to step 1301.

If the calling party dials a valid telephone number 1312B, the system checks to see whether the telephone number is authorized 1314 by referring to the control files described above. If not authorized, the system informs the calling party that the telephone number is restricted 1313 and returns to step 1309. If the telephone number is authorized, the system checks 1315 to see whether any limits have been exceeded for this telephone number. If the calling party has reached a maximum number of denied calls 1316, a maximum number of accepted calls 1317, a maximum number of minutes called 1319, or a maximum number of attempted calls 1331 to the number, the system returns to step 1309, preventing the telephone call from taking place. If none of the limits have been exceeded 1318, the system proceeds to check whether a recording is to be made of the telephone call.

First, the system sets 1320 a record flag for this call to "off" to establish a default condition that this call will be not recorded unless certain tests are satisfied.

The system then tests 1321 whether a record flag has been set in the NUMBERS.DTA file 1127 for this telephone number. If this flag is set, then the call should be recorded unless other selections or events override and if the calling party and/or called party give the appropriate consents, as previously determined by the site administrator.

If the record flag is set, then the system checks 1323 whether a no-record flag has been set for this telephone number in the NUMBERS.DTA file 1127. This flag is used to indicate that no recording of telephone calls to this telephone number are allowed, for example, where the telephone number is for an attorney. If the no-record flag is set, then the system updates 1326 the call detail record for the telephone call to indicate that no recording is to be made of the telephone call.

If the NUMBER.DTA file 1127 does not indicate that the telephone call should be recorded, then the system checks 1324 whether the PIN.DTA file 1123 indicates that recordings are to be made. If so, the system again checks 1323 the no-record flag, as above.

If the flag in the PIN.DTA file 1123 is not set, then the system checks 1327 the PINSET.DTA file 1125 (class of service) to determine if the telephone call should be recorded. If so, the system checks 1323 the no-record flag, as above.

If the no-record flag is not set, and any one of record flags in the NUMBERS, PIN, and PINSET data files is set, then the telephone call may be recorded, and so the record flag is set 1322. This enables the telephone to be recorded.

At this point, the system tests 1322A whether a play record message flag is set. This flag is set by the system administrator where consent of the calling party is required. If set, the system will attempt to obtain the calling party's consent to recording the telephone call by playing 1325 a first prompt, in the language previously selected by the calling party, requesting that the calling party consent to the recording/monitoring of the telephone call. The system checks 1328 whether calling party pressed "1" to consent to the recording. If so, the system updates 1327 the call detail record with a consent flag, indicating that the calling party has consented to the recording. The language in which the prompt was played may also be recorded in the call detail record. This information may be subsequently used to efficiently prove that consent to the recording was given by the calling party by simply producing and authenticating the call detail record for this telephone call.

If the calling party did not consent to the recording, the system returns to step 1309.

Next, the system prompts the calling party 1329 to state his or her name; this name is recorded for subsequent playback to the called party. The system then dials the phone number 1332, and waits until an event is detected 1333. If busy 1334, the system so informs the calling party 1338 and returns to step 1309. If a Special Intercept Tone (a triple tone generated by the telephone company to indicate that the number has been disconnected or the network is busy; also called SIT) has sounded 1335, or there is no ring 1336, or there is no answer 1356, the system so informs the calling party 1339 and returns to step 1309.

If a connection is made 1337, the system now determines the language in which to prompt the called party for a consent to the recording of the telephone call, and to obtain this consent. First, the system checks 1341 whether an English flag is set in the SYSTEM.DTA file. If so, then the system sets 1343 the language of this second prompt to be English.

If the English flag is not set, then the system checks 1345 whether a multi-language flag is set in the SYSTEM.DTA file. If so, then the system 1347 queues all of the different language prompts for sequential playback to the called party. In this fashion, the called party hears the request for consent to recording in several different languages, without having to select which language to hear the prompt in.

If the multi-language flag is not set, then the system checks 1349 whether a called party language has been pre-selected, in which event a specific language has been designated for the second prompt. Pre-selection may be made by the system administrator, the calling party (via a prompt requesting the calling party to select the language, similar to steps 1303–1305), or by a previous selection by the called party. If the pre-selected flag is set, then the system sets 1351 the language for the second prompt to the pre-selected language.

If the pre-selected flag is not set, then the system checks 1353 whether the called party selection flag is set. This flag indicates that the called party is to select the language for the second prompt. The system then requests 1355 the called party to select a language, similar to the steps by which the calling party selected the language for the first prompt, in steps 1303–1305. The calling party's key press input is processed to determine the selected language, and the system sets 1359 the language to the selected language. In this fashion the calling party may have the first consent prompt in one language, and the called party may have the second consent prompt in another language. The called party's language selection may be stored in association with the telephone number in the NUMBERS.DTA file for subsequent use as the pre-selected language the next time that telephone number is called. In this fashion, the language for this prompt need only be selected one time by the called party. This feature is beneficial since it reduces the amount of time the telephone call is connected, and thus reduces additional telephone charges.

If the called party selection flag is not set, then the system defaults and sets 1357 the language of the second prompt to the language previously selected by the calling party.

The above steps represent a large variety of steps for selecting the language of the second prompt. In alternate embodiments, some of these may be eliminated, or used in various different orders or combinations.

Once the language of the second prompt is selected, the system checks 1361 whether the no-record flag is set. As above, this flag will determine whether the telephone call can be recorded. If set, the system plays 1363 the appropriate prompt informing the called party that the telephone call is confidential and will not be recorded or monitored. The system next prompts 1365 the called party that there is a collect call from the calling party, inserting the recording of the calling party's name into the prompt playback. The called party is requested to press "0" to accept the call charges. The system checks 1367 whether the call is accepted, by testing the called party's keypress. If the call is not accepted, then the system returns to step 1309. If the call is accepted, then the system updates 1379 the call detail record to indicate which prompt was played (here the prompt indicating that the telephone call is not recorded), and the prompt language that was used for the prompt.

If the no-record flag is not set at step 1361, then the system checks 1399 whether the ask called party flag is set. This flag indicates that the called party must consent to recording of the telephone call separately from accepting the call. This flag is set by the system administrator according to the state or federal law applicable to the prison or detention facility. The ability for the system administrator to set this flag makes the present invention flexible and adaptable for use in different jurisdictions, since some jurisdictions may require specific called party consent, and others may not. The system proceeds to obtain the called party's consent to recording and/or monitoring of the telephone call.

If the ask called party flag is set, then the system provides for an explicit consent to recording, and a separate consent to acceptance of the telephone call. First, the system prompts 1369 the called party with the second prompt in the selected language, informing the called party that the telephone call may be recorded or monitored, and requesting an input of "0" if the called party consents to such recording. The system tests 1371 whether consent was given by the called party. If not, the system returns to step 1309, terminating the telephone call.

If consent is given, then the system next prompts 1373 whether the called party will accept the charges for the collect call, as above. The system checks 1367 whether the called party accepts the charges. If so, the system proceeds to update 1379 the call detail record to indicate which prompts were played (here the prompts for requesting consent and acceptance) and which language was used for these prompts to the called party. In this fashion there is a computer readable record which identifies the specific prompts that were played to both the calling and called parties, and the languages of the prompts. This information is useful in legal proceedings to demonstrate the parties' knowing consent to any recording or monitoring of the telephone call. Consolidation of the indications of consent and language into a single call detail record for a specific telephone call simplifies the authentication of the record, and the evidence of consent. If the call is not accepted, then the system terminates the call, and continues at step 1309.

If the ask called party flag is not set, then it is not necessary to obtain specific consent to the recording/monitoring of the telephone call. Accordingly, in this embodiment, a single prompt is played 1375 informing the called party that the telephone call may be recorded/monitored, and requesting the called party to either accept or decline to consent to recording and to accept the telephone call and charges. If the call is accepted 1367, then the call detail record is updated 1379, again indicating the prompt that was played and the language. If the call is not accepted, then the call is terminated, and the system returns to step 1309.

Once the system has updated 1379 the call detail record, the system lets the telephone call proceed 1381. While the conversation takes place, the system checks for the occurrence of events. When an event is detected 1382, the system reacts as follows.

If a 3-way telephone call is initiated 1387, the system checks 1391 the control files to determine whether recordings are to be made for 3 way telephone calls. If not, the system returns to step 1381, and continues to monitor for events. If so, and if allowed, it starts recording 1392 and returns to step 1381. When a telephone call is recorded 1392, a flag may be set in the call detail record indicating this fact If the calling party hangs up 1388, the system returns to step 1309.

If there are only 60 seconds remaining in the time limit for this telephone call or for this telephone number 1383, the calling party is so informed 1384 and the system returns to step 1381.

If there are only 15 seconds remaining in the time limit for this telephone call or for this number 1385, the calling party is so informed 1386 and the system returns to step 1381.

If the time limit is reached for this telephone call or for this number 1389, the system terminates the telephone call, returning to step 1309.

Optionally, if a network command 1395 is received by the system from the system administrator, then the system can begin recording of the telephone call, even if the no record flag was set for this telephone number; in this manner the system administrator can record a telephone call, for example, if the inmate calling party waives confidentiality of the telephone call to an attorney.

Optionally, if the system detects 1393 that the calling party is dialing digits, attempting to conference another party in, or otherwise contact another party, the system can terminate the telephone call, begin recording of the call, or other processes, depending on what event was detected, and either returning to step 1381 or returning to step 1309 on termination.

The above described method of operation thus provides for a fully automated process of requesting and obtaining the consent of either the calling party or the called party, in any of a variety of languages, and further provides for the creation of a computer readable, persistent record which can be used to prove that consent was given.

Referring to FIG. 14, there is shown a diagram of a call detail record and its fields. The call detail record 1400 is stored in a computer readable memory or medium, such as RAM 111, or more preferably in persistent storage, such as storage 114. The call detail record 1400 includes the following fields particular to the present invention. A message played field 1402 stores the flags which indicate which prompts were played, for both the calling party and the called party, and the languages they were played in. Flags indicating which prompt was played may also encode which language, by having each combination of prompt and language identified by a specific flag or field code. In the disclosed embodiment this field is updated in steps 1327 and 1389.

The recorded field stores the flag indicating whether the telephone call was in fact recorded. This field is optional, and used in embodiments where evidence of whether a particular call was or was not recorded is desired.

The accept code field stores flags indicating whether the calling party and/or the called party consented to the recording of the telephone call, and also whether the called party accepted the charges for the telephone call.

Persistent storage makes the call detail record for a telephone call makes this record available for use in legal proceedings that challenge whether the telephone call was legally recorded. The evidence of which prompts were played, and whether the parties consented to the recording is useful information that can be easily authenticated in a legal proceeding, and used to establish the parties' consent.

Referring now to FIG. 3A, there is shown a Main Screen 300 for the system, as it would appear on display screen 113. Main Screen 300 includes the following information about the telephone lines:

Ln 301: The line number.

Status 302: The current operational state of a telephone call. For example, when INSTRUCT is displayed, the system is playing a voice prompt instructing the calling party to dial zero plus the number he or she wishes to call (step 1310 in FIG. 13). When ASK NAME is displayed, the system is asking the calling party to state his or her name (step 1329). When GET NAME is displayed, the system has asked the calling party to state his or her name and is now waiting for the recording of the name to complete (between steps 1329 and 1330). When THANKS is displayed, the system is playing a message saying "Thank you for using Gateway Technologies" (step 1380).

Number 303: The ten-digit number being called. If only seven digits were dialed, the system prefixes the number with the local area code.

Zone 304: The physical location of the telephone connected to the line.

Time 305: The elapsed time of the call.

Referring now to FIG. 3B, there is shown a Secondary Screen 311 for the system, as it would appear on display screen 113. The user can switch between the two screens at will. Secondary Screen 300 includes the following information about the telephone lines:

Ln 301: The line number.

Current state 306: Equivalent to status 302 shown in FIG. 3A.

Calls 307: The total number of calls attempted from the telephone.

Okay 308: The number of accepted calls made from the telephone.

Deny 309: The number of calls that were completed but denied by the called party.

Bad 310: The number of calls that were attempted but not completed for some reason. Includes busy signals, no answer, and the like.

System Parameter File 1109 The System Parameter File 1109 specifies configuration and operational parameters relevant to the operation of GWMAIN.EXE 1101. The system administrator uses support program SYSFILE.EXE 1102, also known as the System Parameter File Editor, to supply configurations and parameters to be stored in the System Parameter File 1109. Entry screens for the System Parameter File Editor are shown in FIGS. 4A and 4B. The following is a description of each of the items stored in the System Parameter File 1109:

System ID This parameter is used by the system in naming the Call Detail Record (CDR) files. A new CDR file is created using the Year, the Site ID, and the day of the year each 24 hours. (For example, a Site named TSTOA would have a CDR file named 92TSTOA. 180 for Jun. 29, 1992.)

Site Name This parameter contains the Site Name and is used to print the report headers on reports generated by the AWS-4000. It is also displayed on the secondary screen for GWMAIN.EXE.

System PW The System Password is used to protect sensitive portions of the system from unauthorized use.

Lines This parameter is used to tell the system how many active lines are to be installed. If a system is using nine lines of an available twelve lines, setting this parameter to '9' will cause the system to display IDLE on lines 10, 11 and 12 rather than the usual ON-HOOK on the GWMAIN.EXE primary screen.

Callback # This number is used by the internal alarm system (if activated) as the number to call if an emergency call is placed. This would normally be the Administration Office where the AWS-4000 is located.

Debug Disp Setting this parameter to 'Y' will display various debug information on the screen while the system is running. You may be requested to turn on this feature by Gateway Support Personnel if you are having problems with your system. You may also activate the Debug Display by press F8 on the console or monitoring workstation keyboard.

Debug Write Setting this parameter to 'Y' will write various debug information to a file that can be processed by Gateway Technologies, Inc. to determine what is causing a problem with your system. You may be requested to turn this feature on by a Gateway Support technician. You may also activate this feature by pressing Alt-F8 on the console or monitoring workstation keyboard.

Time Slice Ticks This parameter determines the maximum amount of time the multi-tasking kernel will allow for a process before placing it on hold and letting other processes run. This value is in CPU clock ticks and should not be modified except under instruction from Gateway Technologies, Inc. The default value is 20.

DTMF Interdigit This parameter determines the amount of time between DTMF digits when the system is dialing out. The default value is 5 and it should not be changed without specific instructions from Gateway Technologies, Inc.

DTMF Duration This parameter defines the length of time, in 10 millisecond increments, that a DTMF tone sounds. This option is only active on out-bound dialing, it's default is 10 (100 ms) and it should not be changed without specific instructions.

Ring On Detect This parameter is the length of time, in 10 millisecond increments, that the system will use to determine that ring voltage is present on the telephone line. The default value is 3 (30 milliseconds) and should not be changed.

Ring Off Detect This parameter is the length of time, in 10 millisecond increments, that the system will use to determine that ring voltage has disappeared on the line. The default is 5 (50 ms) and should not be changed.

Off-hook Delay The off-hook delay is the amount of time between the time you request the Dialogic Card to take the phone off-hook and the time an off-hook event is generated by the system. This value allows the relays to debounce and prevents problems during call processing. The default value is 50 (500 ms) and should not be changed.

Silence Debounce This value, in 10 millisecond increments, is the amount of time at the end of a possible silence period that is ignored in determining whether a silence period has actually occurred. The default value is 4 (40 ms) and should not be changed.

LC Off Time This value, in 10 millisecond increments, is the length of time that Loop Current must be absent before the system returns a Loop Current Drop event. The default is −1, which sets the detection to the smallest possible value (This setting controls the maximum length of time a pulse dial pulse is allowing loop current to flow. It is not currently used in any CPS-4000 system. The default value is 50 (500 ms) and should not be changed.

PD Min Make This setting controls the minimum length of time a pulse dial digit will allow loop current to flow. It also is not currently used in any CPS-4000 system. The default value is 2 (20 ms) and should not be changed.

PD Interdigit This value controls the maximum interdigit timing on pulse dialing. It is not currently used on any CPS-4000 system. The default is 15 (150 ms) and should not be changed.

PD Min Break This value is the minimum interdigit timing on pulse dialing. It is not currently used on any CPS-4000 system. The default is 2 (20 ms) and should not be changed.

Ring Reset This value is the length of time between possible ring detection and a second ring detection where the first possible ring is dropped from consideration. The default value is 80 (800 ms) and should not be changed.

Local Area Code This is the local area code. It is appended internally by the system to all seven digit dialed numbers for lookup in the NUMBER File for verification, since all numbers are stored in the Number File as ten digit phone numbers.

Maximum Name Record This value is the length of time allowed for an inmate to record his name. The default value is 3 seconds and probably should not be changed. Do not set this value to less than 2 seconds since the timing is plus or minus 1 second.

Allow Phone Testing Setting this parameter to 'Y' will allow you to go to an inmate phone, dial 123456789 and have the system dial the local Central Office and record the outside line number. It will then play back the outside line number. The default value is 'N' and should only be changed during installation of the system. This feature is for diagnostic purposes only.

Beep on Drop This parameter will turn on a beeping tone if the phone is left off hook.

Beep Dialing Setting this field to 'Y' will turn off call progress monitoring and activate the call progress prompts, i.e. the line was busy, etc.

Outside Line Numbers These fields contains the outside line numbers of each inmate phone line. You must fill out all AVAILABLE lines or the GWMAIN.EXE program will not run. These numbers are used during the billing process so it is important that they be correct.

Local Dialing Prefix This field is used to store a dialing prefix that is necessary for all local calls (dialed seven digits and marked local in the NPANXX file, see below). This number is prepended to each local call. For example, if the phone lines are behind a PBX that requires that a '9' be dialed before an outgoing number, you would put a '9' in this field.

IntraLATA Dialing Prefix This field is used to store a dialing prefix for all IntraLATA calls (dialed seven digits but not marked local in the NPANXX file, see below). This number is prepended to each IntraLATAcall.

Long Distance Dialing Prefix This field is used to store a dialing prefix for all Long Distance calls (dialed ten digits). This number is prepended to all Long Distance calls. For example, if you want to route all calls through AT&T, you would place 102881 in this field. If you want to use the designated carrier, place a '1' in this field.

System Start Time This field is the time the system will begin to allow phone calls. The System Start Time is stored in military format (00:00–23:59) and overrides any values in the Channel Parameter File (see below). The default start time is midnight (00:00).

System Stop Time This field is the time the system will stop allowing phone calls. It is stored in military time format and overrides any values in the Channel Parameter File (see below). The default stop time is midnight (24:00).

Recycle Time This field is the time, in military format, that the system will reboot each day. If you have an AWS-4000 system, you will want this value to remain at 00:00 (do not reboot), otherwise the standard value is 03:00 (3:00 A.M.).

Message # for 1st Branding Indicate which long distance or other telephone service is being used.

Message # for 2nd Branding Same.

Message # for Identification Identifies the name of the facility.

Message # for Location Indicates the location of the facility.

Language Support First-English, Second-Spanish, Third and Fourth-Optional other languages.

Maximum Attempts/Number/Day The maximum number of call attempts allowed in one day before the number is automatically blocked by the system. Default is 50.

Allow Person/Person Collect Setting this field to 'Y' turns on the Person-to-Person collect calling for the entire system.

Line Locations These fields are displayed on the GWMAIN.EXE primary screen as Zone and are only used for administration information.

Channel Parameter File 1110 The Channel Parameter File 1110 specifies operational parameters for each individual telephone line. The system administrator uses support program CHNFILE.EXE 1103, also known as the Channel Parameter File Editor, to supply parameters to be stored in the Channel Parameter File 1110. Entry screens for the Channel Parameter File Editor are shown in FIGS. 5A, 5B, 5C, and 5D. The following is a description of each of the items stored in the Channel Parameter File 1110:

Channel Number This parameter is the line number you are modifying. Value may range from '1' to '24'.

Time Limit This is time, in seconds, that you are allowing a call to continue. The default value is 900 seconds (15 minutes). Other common values are 3600 seconds (1 hour) and 1800 seconds (½ hour).

ID System Setting this value to 'Y' turns on the base Gateway Restricted ID (GRID) system, requiring an inmate to enter an ID before making a call, but not requiring Administration Approved phone numbers.

Full Setting this value to 'Y' activates the full Gateway Restricted ID (GRID) system, requiring an inmate to enter an ID before making a call and requiring that Administration Approved phone numbers be available before allowing a call.

Pulse Detect Setting this value to 'Y' activates the pulse detection feature of the CPS-4000, allowing the called party to accept a collect call using a pulse dial phone. Setting this value to 'N' will only allow DTMF capable phones to accept CPS-4000 generated calls. The default is 'Y' and should not be changed.

Passive Accept Making this field a 'Y' allows all calls from the CPS-4000 to be accepted without active acceptance by the called party. The default value is 'N' and should not be changed.

Start This is the time that this channel will begin to allow phone calls. It is overridden by the value in the System Start Time in the System Parameter File (see above). It is in military time.

Stop This is the time that this channel will stop allowing phone calls. It is overridden by the value in the System Stop Time in the System Parameter File (see above). It is in military time format.

DTMF Detection Time This value is the length of time a DTMF tone must be present to be detected by the channel. The default value is 5 (50 ms) and should not be changed.

DTMF Edge Event This value can be either '1' or '2'. A '1' signifies that the DTMF tone is detected on the leading edge of the tone (which may cause large numbers of false detects) and a '2' signifies that the DTMF tone is detected on the trailing edge (which may show up in recordings). The default for the CPS-4000 is '2' and should not be changed.

DTMF Receive Guard Time This value is used to guard against false DTMF detection. The default value is '0' and should not be changed.

Commissary Active This field is used to turn on/off commissary access for the specified line.

Silence Compression Delay This value is the length of time in milliseconds that a silent period must exist before it is compressed by the system. The default value is 200 and should not be changed.

Number of Rings before No Answer This field is the number of rings that the system will wait before returning a "No Answer" event. The default is '4' but typical values range from '4' to '6'.

Delay before Call Analysis Begins This is length of time, in 10 millisecond increments, that the system waits after completing dialing before beginning call analysis, which determines whether the phone was busy, rang with no answer, detected an intercept tone, etc. The default value is 25 (250 ms) and should not be changed.

Time out delay on no signal This is the number of milliseconds the system will wait during call analysis if there is no detectable signal before returning a No Ringback event. The default value is 4000 and should not be changed.

Delay before LC drop is a connect This value is the length of time after a Loop Current drop has been detected before the system will return an Answered event. The default value is −1 (disabled) and should not be changed.

Delay before returning a LC drop This is length of time after a loop current drop has been detected before the system returns a loop current drop event. The default is 10 (100 ms) and should not be changed.

Return Connect on leading edge This parameter determines whether the Loop Current drop is returned on the leading edge (1) or trailing edge (2) on a connect. Since the CPS-4000 does not use loop current drop to determine connect this value is not actually used. The default is 2 and should not be changed.

Time out for continuous signal This is the amount of time the call analysis will wait if a continuous signal is present (outside line is bad) before returning a No Ringback Event. The default is 650 ms and should not be changed.

Tolerance above 1st low This is the percentage amount of acceptable deviation allowed for the short low signal. The default is 13 and should not be changed.

Tolerance below 1st low This is the percentage amount of acceptable deviation allowed below for the short low signal. The default is 13 and should not be changed.

Tolerance above 2nd low This is the percentage amount of acceptable deviation allowed above for the long low signal. The default is 13 and should not be changed.

Tolerance below 2nd low This is the percentage amount of acceptable deviation allowed below for the long low signal. The default is 13 and should not be changed.

Tolerance above high This is the percentage amount of acceptable deviation allowed above for the high signal. The default is 13 and should not be changed.

Tolerance below high This is the percentage amount of acceptable deviation allowed below for the high signal. The default is 13 and should not be changed.

Max time for 1st low to detect busy This is the maximum time in 10 millisecond increments allowed for the short low on a busy signal. The default is 90 (900 ms) and should not be changed.

Max time for 2nd low to detect busy This is the maximum time in 10 millisecond increments allowed for the long low on a busy signal. The default is 90 (900 ms) and should not be changed.

Max time for high to detect busy This is the maximum time in 10 millisecond increments allowed for the high signal on a busy signal. The default is 90 (900 ms) and should not be changed.

Number of additional states before busy This is the number of additional cycles that the system must detect on a busy signal before returning a busy event. The default is 0 and should not be changed.

Smallest silence Interval This is the smallest interval of silence that the system will accept as a silent event. The default is 15 (150 ms) and should not be changed.

Smallest sound Interval This is the smallest interval of sound that the system will accept as a no-silence event. The default is 19 (190 ms) and should not be changed.

Max time for short low detected as double ring This is the maximum time for the short low period if this is to be detected as a double ring. The default is 90 (900 ms) and should not be changed.

Min time for long low detected as double ring This is the minimum time for the long low period if the signal is to be detected as a double ring. The default is 225 (2250 ms) and should not be changed.

Enable Operator Intercept Detection Placing a 'Y' in this field will enable Special Intercept Tone (SIT) detection. The default is 'Y' and should not be changed.

Min Intercept duration for detection This is the minimum length of time the SIT tone must be present before being detected as a SIT tone. The default is 10 (100 ms) and should not be changed.

Silence Trailing Edge Debounce The minimum amount of silence that will be recorded if silence compression recording is being used. The default is 0 and should not be changed.

High Size This value is checked against the length of the high period to determine which low maximum to use. The default is 90 (900 ms) and should not be changed.

Low Max A Maximum low period before connect if length of high period>high size. The default is 700 (7000 ms) and should not be changed.

Low Max B Maximum low period before connect if length of high period. The ring number you wish call analysis to begin. The default is 1 and should not be changed.

High ceiling Maximum length of high period if retraining is required. The default is 78 and should not be changed.

Low ceiling Maximum length of short low period if retraining is required. The default is 58 and should not be changed.

Low allowed frequency The lower boundary in hertz for frequency detection. The default is 900 and should not be changed.

High allowed frequency The upper boundary in hertz for frequency detection. The default is 1000 and should not be changed.

Min time within frequency for detect The minimum amount of time the signal must be within the specified frequencies before SIT detection event is generated. The default is 5 (50 ms) and should not be changed.

Bad signal reject percentage This is the percent of time the signal frequency can be outside of the boundaries and still be detected. The default is 20 and should not be changed.

Max answer duration The length of time before a connect is assumed if no other event is generated. The default is 1000 (10000 ms) and should not be changed.

Silence deglitching value The minimum amount of silence required before sound is considered an answer event. The default is 60 (600 ms) and should not be changed.

You will need to complete a Channel Parameter File record for each channel used in the CPS-4000.

Number Control File NUMBER.DTA 1127 The Number Control File stores information regarding every number that has been called. It is also used for blocking and unblocking particular numbers, allowing passive acceptance of specific numbers, or triggering alarms and/or recordings when particular numbers are called. The system administrator uses support program NUMBER.EXE 1128 to supply information regarding each number. An entry screen is shown in FIG. 6. The following is a description of each of the items in the Number Control File:

Number The ten digit telephone number.

Date Last Verified/Changed The date of the last time this record was modified.

Verified/Changed by The initials of the last person to modify this record.

Count Since Changed/Verified The number of call attempts to this number since the last manual change to this record.

Count Since Reset The number of call attempts to this number since the Maximum calls/Number/Day limit has been reached and reset.

Allow Passive Accept Whether this number is allowed to use passive accept.

Block Code This is block code used by the system. The usual block codes are either UOK if you want to allow calls to the number or HBL if you want to block calls to the number. You may also use FRE for free calls, or SPL to splash calls to the local operator.

Dialing Instructions This field is used if you want to have special dialing instructions for a specific number. This field is prepended to the number before dialing.

Local Call Normally, local calls are determined in the NPANXX file (see below). However, if a call is to be dialed 0+7, or if you have special dialing instructions, you will need to set this field to 'Y' if the number is a local call.

Record Calls to This Number Setting this field to 'Y' will record all calls made to this number.

Alarm Calls to This Number Setting this field to 'Y' will cause an alarm to sound at the CPS-4000 when a call is made to this number.

Attempt Counter This field is used by the CPS-4000 to track the number of call attempts made to this number. It should not be changed.

Accept Counter This field is used by the CPS-4000 to track the number of accepted calls made to this number. It should not be changed.

Time Counter This field is used by the CPS-4000 to track the number of seconds of talk time made to this number. It should also not be changed.

Attempt Date The date of the first attempt made to this number after the last rollover date. It is filled in by the CPS-4000 and should not be changed.

Accept Date This is the date of the first accept after the last rollover date. It is also filled in by the CPS-4000 and should not be changed.

Time Date This field is filled in by the CPS-4000 and should not be changed. It is the date of the first accept after the last rollover date.

Attempt Override Setting this flag to 'Y' will de-activate the attempt tracking feature of the CPS-4000. Normally, this is left as 'N'.

Accept Override Setting this flag to 'Y' will de-activate the accept tracking feature of the CPS-4000. Normally, this is left as 'N'.

Time Override Setting this flag to 'Y' will de-activate the time tracking feature of the CPS-4000. Normally, this is left as 'N'.

No Record This flag is used to indicate that telephone calls to this phone number are not to be recorded, no matter what other record settings may be in effect.

NPANXX Control File NPANXX.DTA 1115 The NPANXX Control File NPANXX.DTA 1115 stores information regarding area codes and telephone exchanges. It permits blocking and unblocking exchanges, selection of particular exchanges where all calls are local calls, and the like. The system administrator uses support program NPANXX.EXE 1108 to supply information regarding each exchange. An entry screen is shown in FIG. 7. The following is a description of each of the items in the NPANXX Control File 1115:

NPANXX The six digit NPANXX (Area code+ Exchange).

Date Last Verified/Changed The date of the last time this record was modified.

Verified/Changed by The initials of the last person to modify this record.

Passive Accept Setting this field to 'Y' allows all calls to this NPANXX to be accepted passively.

Block Code This is block code used by the system. The usual block codes are either UOK if you want to allow calls to this NPANXX or HBL if you want to block calls to this NPANXX. You may also use FRE for free calls, or SPL to splash calls to the local operator. Note that this applies to the WHOLE NPANXX.

Dialing Instructions This field is used if you want to have special dialing instructions for a specific NPANXX. This field is prepended to the number before dialing.

Local Call You will need to set this field to 'Y' if the NPANXX is a local call.

NPA Control File NPA.DTA 1112 The NPA Control File NPA.DTA 1112 stores information regarding telephone area codes. It permits blocking and unblocking area codes, allowing free calls in certain area codes, and the like. The system administrator uses a support program NPA.EXE 1105 to supply information regarding each exchange. An entry screen is shown in FIG. 8. The following is a description of each of the items in the NPA Control File 1112:

NPA The three digit NPA (Area code).

Date Last Verified/Changed The date of the last time this record was modified.

Verified/Changed by The initials of the last person to modify this record.

Passive Accept Setting this field to 'Y' allows all calls to this NPA to be accepted passively.

Block Code This is the block code used by the system. The usual block codes are either UOK if you want to allow calls to this NPA or HBL if you want to block calls to this NPA. You may also use FRE for free calls, or SPL to splash calls to the local operator. Note that this applies to the WHOLE NPA.

Dialing Instructions This field is used if you want to have special dialing instructions for a specific NPA. This field is prepended to the number before dialing.

NXX Control File NXX.DTA 1113 The NXX Control File NXX.DTA 1113 stores information regarding particular exchanges in all area codes. The system administrator uses support program NXX.EXE 1106 to supply information regarding the NXX to be blocked. An entry screen is shown in FIG. 9. The NXX control file contains three fields for each record: the NXX to be blocked, the date of last modification of the record, and the initials of the person who last modified the record.

Fraud Control Parameter File 1114 The Fraud Control Parameter File 1114 is used to set restrictions on inmate calling patterns to reduce fraudulent use of the telephone system. The system administrator uses support program CTLFILE.EXE 1107 to set parameters regarding calling patterns. An entry screen is shown in FIG. 10.

In the preferred embodiment, the Fraud Control Parameter File 1114 allows the system administrator to specify a number of local and/or long distance calling pattern parameters. Each such parameter specifies an amount field, a period field, and a roll-over field. The amount field specifies the maximum number of calls permitted (if set to zero, the parameter is disabled). The period field specifies the time period for measuring the maximum number of calls (i.e., daily, weekly, or monthly). The roll-over field specifies when successive time periods will begin (i.e., on a particular day of the week or a particular day of the month).

File 1114 stores the above information with respect to the following: the number of call attempts that will be allowed to a specific number; the number of accepted calls that will be allowed to a specific number; and the number of minutes of conversation that are allowed for a specific number. Once any of these parameters are exceeded for a specific number, the system can either block future calls or supply a trigger for recording future calls. The system administrator may specify which action is to be taken when a parameter is exceeded. This information is stored in Number Control File NUMBER.DTA 1127 and ID Files 1111. Recording may also be triggered if a 3-way call or call forwarding attempt is detected, as described above in connection with the discussion of GWMAIN.EXE.

Control files 1112–1115 specify parameters that may be applied to call blocking or call monitoring. Thus, for example, Fraud Control Parameter File 1114 may indicate that, after a certain number has been called a given number of times, the system will record all subsequent calls to that number. Alternatively, File 1114 may specify that all subsequent calls to that number may be blocked. Thus, the present invention provides improved flexibility for the system administrator to specify how certain types of calls should be handled.

I claim:

1. A computer implemented method of obtaining consent to the recording of telephone calls, comprising:

establishing a call record of a telephone call made by a calling party to a called party;

playing a first prompt requesting the calling party to consent to, or to refuse a recording of the telephone call;

receiving a first input signal from the calling party in response to the first prompt indicating either the calling party's consent or the refusal of consent to the recording of the telephone call;

storing an indication of the either the calling party's consent or refusal of consent to the recording of the telephone call in the call record; and blocking the telephone call in response to the received first input signal when the received first input signal indicates the calling party's refusal of consent to the recording of the telephone call.

2. The method of claim 1, further comprising:

storing in the call record an indication of the language in which the first prompt was played.

3. The method of claim 1, further comprising:

playing a second prompt requesting a called party to consent to or refuse the recording of the telephone call;

receiving a second input signal from the called party indicating either the called party's consent or refusal; and storing an indication of either the called party's consent or refusal in the call record.

4. The method of claim 3, further comprising:

storing in the call record an indication of the language in which the second prompt was played.

5. The method of claim 3, wherein playing a second prompt further comprises:

playing the second prompt in a plurality of languages.

6. The method of claim 3, wherein playing a second prompt further comprises:

playing the second prompt in a language selected by the calling party.

7. The method of claim 6, further comprising:

storing in the call record an indication of the language in which the second prompt was played.

8. The method of claim 3, wherein playing a second prompt further comprises:

playing the second prompt in a first default language, and in a second, different language selected by the calling party.

9. The method of claim 3, wherein playing a second prompt further comprises:

prompting the called party to select a language for the second prompt; and playing the second prompt in the language selected by the called party.

10. The method of claim 9, further comprising:

storing in the call record an indication of the language in which the second prompt was played.

11. The method of claim 3, further comprising:

determining from a telephone number of the telephone call whether a language for the second prompt has been selected;

responsive to a language for the second prompt having been previously selected, playing the second prompt in the selected language;

responsive to a language for the second prompt having not been previously selected, prompting the called party to select a language for the second prompt, and storing an indication of the selected language in association with the telephone number.

12. The method of claim 11, further comprising:

storing in the call record an indication of the language in which the second prompt was played.

13. The method of claim 3, wherein playing a second prompt further comprises:

determining from a telephone number of the telephone call whether a language for the second prompt has been selected;

responsive to a language for the second prompt having been previously selected, playing the second prompt in the selected language;

responsive to a language for the second prompt having not been previously selected, prompting the calling party to select a language for the second prompt, and storing an indication of the selected language in association with the telephone number.

14. The method of claim 13, further comprising:

storing in the call record an indication of the language in which the second prompt was played.

15. The method of claim 1, further comprising:

playing a second prompt informing a called party that the telephone call may be recorded;

receiving a second input signal from the called party indicating either the called party's acceptance or refusal of the telephone call; and storing an indication of either the called party's acceptance or refusal in the call record.

16. The method of claim 1, further comprising:

storing an indication of whether or not the telephone call was recorded in the call record.

17. The method of claim 1, further comprising:

maintaining synchronized clocks in a call processing system from which the telephone call is made and in a call recording system in which the telephone call is recorded;

storing in the call record a time at which the telephone call is recorded; and storing in a call recording log in the call recording system the time at which the call is recorded, such that the times in the call record and the call recording log are the same.

18. The method of claim 1, further comprising:

determining from a telephone number of the telephone call whether the telephone call may be recorded;

responsive to determining that the telephone call may be recorded:
- playing the first prompt; and
- storing an indication in the call record that the first prompt was played; and responsive to determining that the telephone call may not be recorded:
- playing a second prompt indicating that the telephone call will not be recorded.

19. The method of claim 18, further comprising:

storing an indication in the call record that the second prompt was played; and storing an indication in the call record that the telephone call was not recorded.

20. The method of claim 1, further comprising:

determining from a telephone number of the telephone call whether the telephone call may be recorded;

responsive to determining that the telephone call may be recorded:
- playing the first prompt; and
- storing an indication in the call record that the first prompt was played; and
- responsive to the first input signal indicating that the calling party refuses the recording of the telephone call, terminating the telephone call; and
- responsive to the first input signal indicating that the calling party consents to the recording of the telephone call, completing the telephone call.

21. A computer readable medium for use in a telephone call recording system, comprising:
- a call record stored in the computer readable medium and including:
  - a telephone number of a called party associated with a telephone call;
  - an indication of at least one of:
    - a prompt that was played informing the calling party that the telephone call may be recorded;
    - a prompt that was played informing the calling party that the telephone call would not be recorded;
  - an indication of the calling party's consent or refusal of consent to recording of the telephone call in response to the prompt informing the calling party that the telephone call may be recorded; and
  - an indication that the call was blocked in response to the indication of the calling party's refusal of consent to the recording of the call.

22. The computer readable medium of claim 21, wherein the call record further comprises:

an indication of a language of the prompt that was played.

23. The computer readable medium of claim 21, wherein the call record further comprises:

an indication of whether the telephone call was recorded or not.

24. The computer readable medium of claim 21, wherein the call record further comprises:

an indication of at least one of:
- a prompt that was played informing the called party that the telephone call may be recorded;
- a prompt that was played informing the called party that the telephone call would not be recorded; and
- an indication of the called party's consent to the recording of the telephone call.

25. The computer readable medium of claim 24, wherein the call record further comprises:

an indication of a language of the prompt played to the called party.

26. A computer program product for obtaining consent to the recording of telephone calls, comprising:
- a computer readable medium;
- an executable computer program stored on the computer readable medium, for controlling a computer system to perform the operations of:
  - receiving from a calling party a telephone number of a called party to completing a telephone call;
  - playing a first prompt requesting the calling party to consent to the recording of the telephone call;
  - receiving a first input signal from the calling party in response to the first prompt indicating either the calling party's consent or the refusal;
  - storing an indication of either the calling party's consent or refusal to consent to the recording of the telephone call received from the first input signal; and
  - blocking the telephone call in response to the indication of the calling party's refusal to consent to the recording of the telephone call from the received first input signal.

27. A computer program product for obtaining consent to the recording of telephone calls, comprising:
- a computer readable medium;
- a plurality of recorded prompts in at least two different languages, and including:
  - at least one prompt indicating that a telephone call will not be recorded;
  - at least one prompt indicating that a telephone call may be recorded;
- a computer executable program stored on the computer readable medium for controlling a computer system to perform the operations of:
  - establishing a telephone call to an input telephone number from a calling party to a called party;
  - selecting a language for, and at least one of, the prompts for playing to the calling party as to whether the telephone call to the input telephone number is to be recorded;
  - playing the selected prompt in the selected language to the calling party;
  - recording an input from the calling party in response to the selected prompt as to whether the calling party consents or refuses to consent to recording of the telephone call; and
  - blocking the telephone call in response to the recorded input when the recorded input indicates that the calling party refuses to consent to the recording of the telephone call.

28. The computer program product of claim 27, wherein the executable computer program on the computer readable medium further control the computer system to perform the operations of:

selecting a language for, and at least one of, the prompts for playing to the called party as to whether the telephone call to the input telephone number is to be recorded;

playing the selected prompt in the selected language to the called party; and recording an input from the called party as to whether the called party consents to recording of the telephone call.

29. A computer system for obtaining consent to the recording of telephone calls, comprising:
- a storage device for storing a plurality of recorded prompts in at least two different languages, including:
  - at least one prompt indicating that a telephone call will not be recorded;
  - at least one prompt indicating that a telephone call may be recorded;
- a memory;
- a telephone interface for coupling the computer system to a telephone network;
- a processor coupled to the memory for executing a computer program stored in the memory; and
- a computer program stored in the memory for controlling the computer system to perform the operations of:
  - establishing a telephone call to an input telephone number from a calling party to a called party;
  - selecting a language for, and at least one of, the prompts for playing to the calling party as to whether the telephone call to the input telephone number is to be recorded;
  - playing the selected prompt in the selected language to the calling party;
  - recording an input from the calling party in response to the selected prompt as to whether the calling party consents or refuses to consent to recording of the telephone call; and
  - blocking the telephone call when the input from the calling party indicates refusal to consent to the recording of the telephone call.

30. A computer implemented method of obtaining consent to the recording of telephone calls, comprising:

- establishing a call record of a telephone call made by a calling party to a called party;
- playing a first prompt requesting the calling party to consent to, or to refuse a recording of the telephone call;
- receiving a first input signal from the calling party in response to the first prompt that indicates either the calling party's consent or the refusal of consent to the recording of the telephone call;
- storing an indication of either the calling party's consent or refusal of consent to the recording of the telephone call in the call record as indicated by the first input signal; and
- overriding an indication of a refusal in the received first input signal if recording of the call is necessary.

\* \* \* \* \*